United States Patent [19]
Orain

[11] 3,965,701
[45] June 29, 1976

[54] CONSTANT VELOCITY UNIVERSAL JOINTS

[75] Inventor: Michel Orain, Conflans-Ste.-Honorine, France

[73] Assignee: Societe Anonyme: Glaenzer Spicer, Poissy, France

[22] Filed: July 8, 1974

[21] Appl. No.: 486,655

[30] Foreign Application Priority Data

July 11, 1973 France .............................. 73.25485
Jan. 28, 1974 France .............................. 74.02774

[52] U.S. Cl. ........................................... 64/21; 64/8
[51] Int. Cl.² ............................................ F16D 3/30
[58] Field of Search ................................ 64/21, 8, 7

[56] References Cited
UNITED STATES PATENTS

| | | | |
|---|---|---|---|
| 3,002,364 | 10/1961 | Bellomo | 64/21 |
| 3,296,834 | 1/1967 | Grauel | 64/21 |
| 3,550,396 | 12/1970 | Miller, Jr. | 64/21 |

FOREIGN PATENTS OR APPLICATIONS

| | | | |
|---|---|---|---|
| 995,137 | 6/1965 | United Kingdom | 64/21 |

*Primary Examiner*—Samuel Scott
*Assistant Examiner*—Randall Heald

[57] ABSTRACT

Universal joints for constant velocity transmission of rotational motion between two shafts able to run at an angle comprising two main parts each mounted on one of the shafts and power transmitting members formed as rollers or balls operatively therebetween. These members have two guiding paths formed by pairs of grooves, one on each of the main parts, in the case of balls, and spindles on one of the main parts and spherical surfaces on the other of the main part, when the members are rollers. The guiding paths on a main part make an angle $\alpha$ with the axis of the shaft on which the part is mounted. Guiding paths of one of the main parts cut guiding paths on the other main part at an angle $2\alpha$. The points of intersection of the guiding paths on one of the main parts for a given pair of members with a plane perpendicular to the longitudinal axis of the shaft associated with the main part is located on a straight line passing through the longitudinal axis and equidistant from the point of intersection of the straight line with the longitudinal axis. The guiding paths associated with a pair of members on a given main part are parallel to one another. When the guiding paths are part-circular, the tangents to the guiding paths of one main part at opposed points along a straight line passing through the center of the joint make the angle $\alpha$ with the axis on which the part is mounted.

22 Claims, 48 Drawing Figures

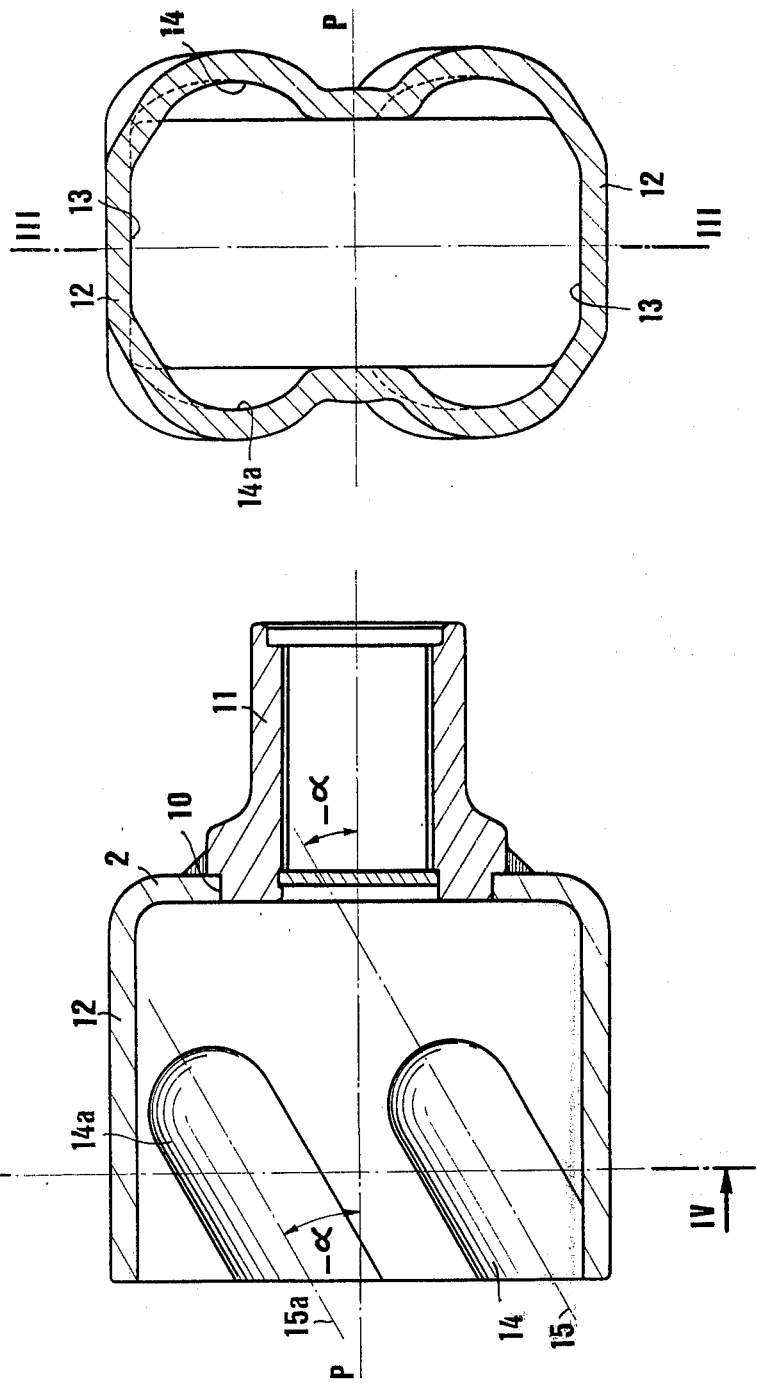

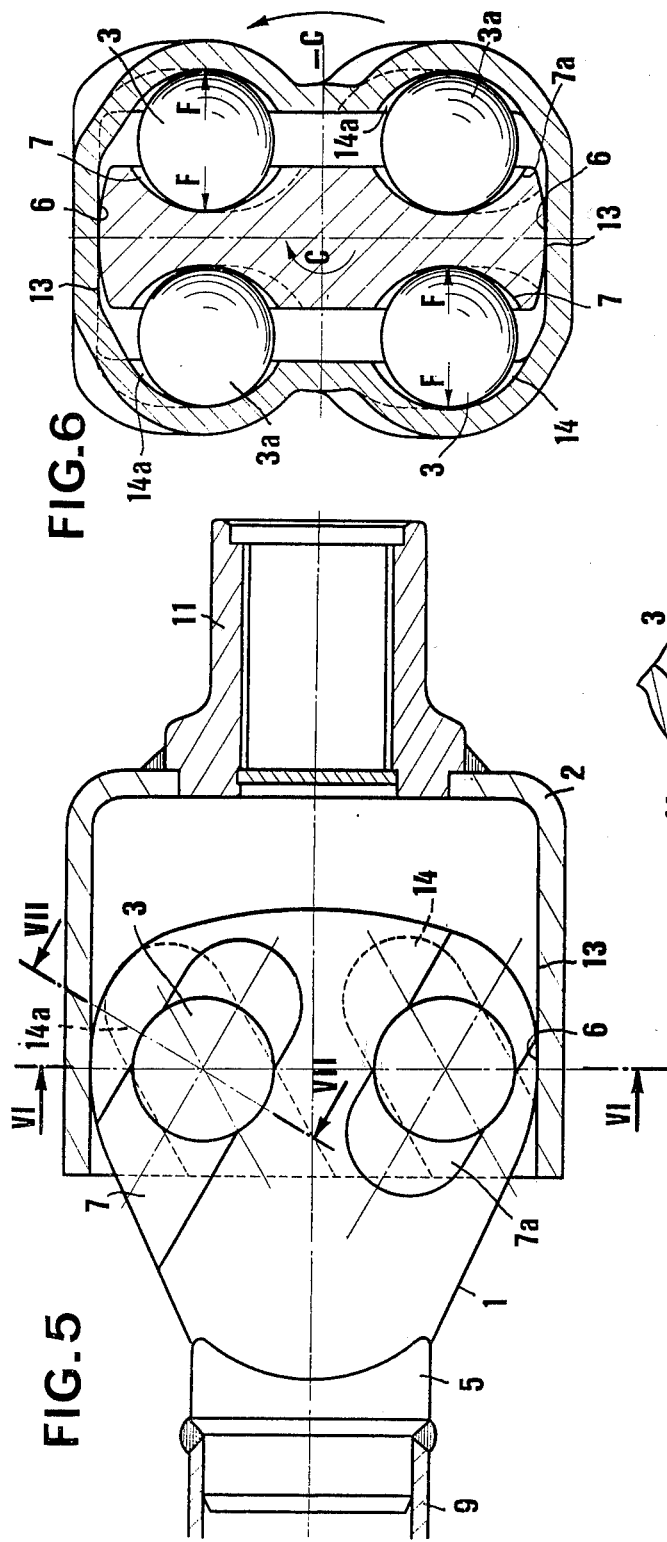

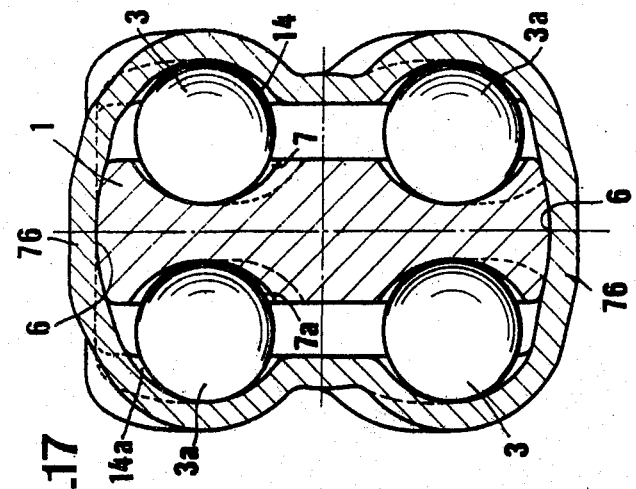
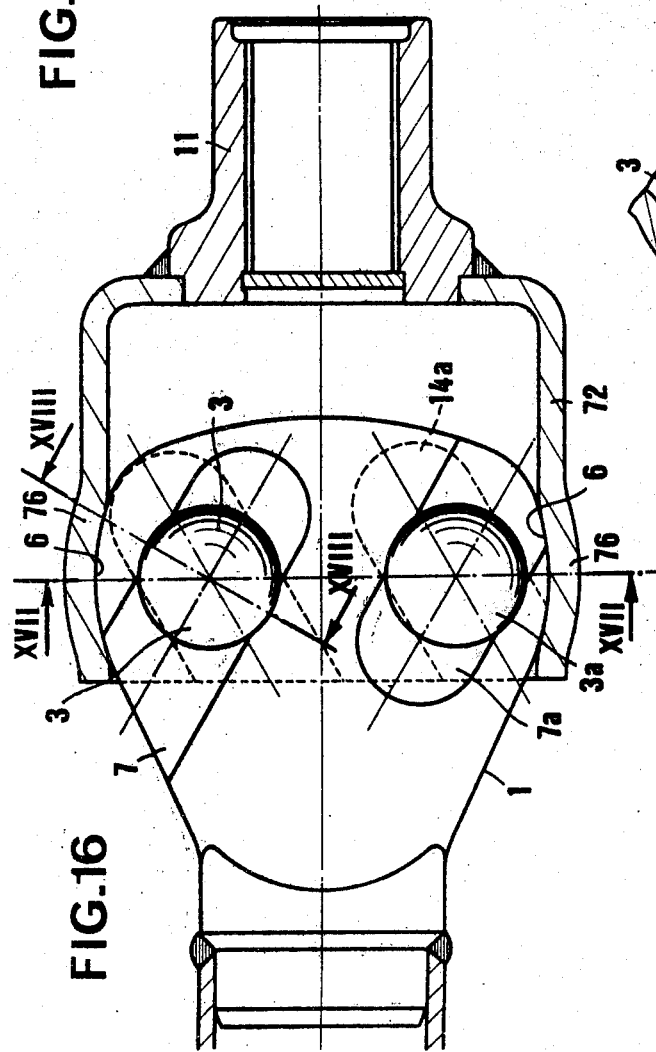
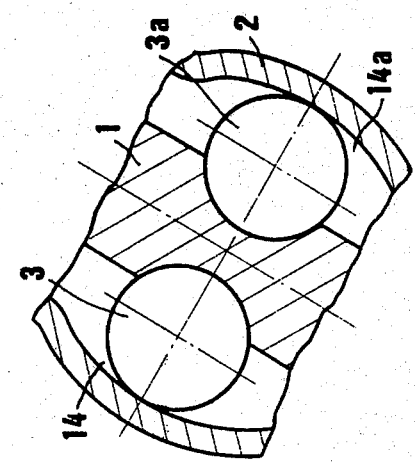
FIG.17
FIG.16
FIG.18

CONSTANT VELOCITY UNIVERSAL JOINTS

The present invention concerns a universal joint for constant velocity transmission of rotational motion between two shafts adapted to run at a constant or variable angle.

Numerous different joints of this type are known, inter alia, a type of joint in which the transmission of motion is ensured between two main parts, each of the main parts being connected for rotation with one of the shafts to be coupled by means of at least four balls which are received respectively in at least four substantially linear grooves or channels of part-circular cross-section formed in the two main parts, the grooves of one of the parts opening outwardly and the grooves of the other part opening inwardly, the longitudinal axes of the grooves of the same part converging towards the axis of the corresponding shaft in the direction of the other part. One joint of this type is known as a Weiss joint.

Such a joint has certain advantages, but it also has its disadvantages. In particular, this joint is of constant velocity operation provided that the two shafts it couples are held perfectly radially centered, the slightest radial play present during manufacture or resulting from wear bringing about knocking during operation. Furthermore, the friction developed between the balls and the grooves receiving the same cause axial pulsations between the shafts thus coupled.

An aim of the present invention is a universal joint of a type similar to the above-described type which does not have the drawbacks of the latter. Indeed, the present novel joint is of perfect constant velocity operation even if its radial centering is not precisely effected and is devoid of both knocking and axial pulsations between the coupled shafts.

The joint according to the invention comprises two main parts each of which is connected for rotation with one of the two shafts to be coupled and between which the power transmission is ensured by at least one pair of power transmitting members having spherical operative surfaces, each of said members being guided in rotation and longitudinal displacement according to two predetermined guiding paths each associated with one of the main parts and making a mean or average angle $\alpha$ with the axis of rotation of the shaft with which the paths are associated and said paths being respectively oriented so that the guiding path of one of the two main parts cuts guiding path of the other main part at an angle of $2\alpha$ when the axes of the two shafts to be coupled are in alignment, the points of intersection of the guiding paths associated with one of the main parts and also corresponding to a given pair of power transmitting members with a plane perpendicular to the longitudinal axis of the shaft to which the part is coupled being located on a stright line cutting through said longitudinal axis equidistant from the point of intersection of the straight line with the longitudinal axis and wherein the improvement comprises the guiding paths corresponding to a pair of power transmitting members and associated with a given main part being parallel to each other.

The term "guiding path" used hereinabove is intended to designate a linear axis or an arc of a circle, and this expression is intended in its geometrical sense. In other words, it is to be understood that a power transmitting member is guided in each main part by a cylindrical or toroidal surface, the generatrices thereof or circles centered on the geometric axis of rotation of the torus, are parallel to the aforesaid guiding path.

When the guiding paths are arcs of a circle, the tangents to these arcs relative to one pair of transmitting members associated with a given one of the main parts, at two spaced-apart points to each side of the axis of the one main part located on a straight line passing through the center of rotation of the joint, make the same angle $\alpha$ with the axis of rotation of the shaft with which they are coupled, the arcs constituting guiding paths for the power transmitting members being respectively oriented so that the arc of the circle associated with one of the main parts cuts the arc associated with the other main part at an angle $2\alpha$ when the axes of the two shafts to be coupled are in alignment.

The angle $\alpha$ is preferable between 10° and 45° depending on the operating conditions the joint must satisfy and namely the maximum operating angle at which it must be able to operate and the sliding path that one of the main parts must undergo with respect to the other in case of a sliding joint: said angle $\alpha$ increasing as the required operating angle increases but must decrease as the sliding length increases.

According to a preferable embodiment, there are at least four power transmitting members with spherical surfaces each comprising a ball which rolls freely in two substantially linear or arcuate grooves of part-circular cross-section formed the main parts, the four power transmitting members ensuring the guiding of the balls for rotational and longitudinal sliding movement. The guiding paths are not in this embodiment formed physically and are constituted by the longitudinal or arcuate axes of the grooves.

According to another embodiment, each of the power transmitting members with spherical surfaces comprises a roller pivotally and slidably mounted on a spindle integral with one of the main parts and physically forming one of the guiding paths of the roller which is enclosed within two coaxial grooves of part-circular cross-section, facing each other and formed in the other main part. In this embodiment the common axis of the two grooves constitutes the other guiding path or axis of the roller and has no physical form.

In case that more than one pair of power transmitting members with spherical surfaces are provided the guiding paths for two different pairs of members on the same main part may be non-parallel with each other and make with respect to the longitudinal axis of the shaft associated with the last-mentioned main part an angle equal to and in a direction opposite that which the guiding paths of another pair of members make with the last-mentioned longitudinal axis.

Moreover, the guiding paths of the spherical members associated with two different pairs and located to each side of the planes of symmetry of the main part are not necessarily parallel to each other. On the contrary, these paths may make the same angle with the plane of symmetry.

Various embodiments of the joint according to the invention are described hereinafter with reference to the accompanying drawings in which:

FIG. 3 is a longitudinal sectional view taken on the line III—III in FIG. 4 of the other main part or sleeve member of the same joint;

FIG. 4 is a cross-sectional view taken on the line IV—IV in FIG. 3;

FIG. 5 is a view partly in elevation and partly in longitudinal section of a joint made up of the parts shown in FIGS. 1–4, the axes of the two parts being in alignment;

FIG. 6 is a cross-sectional view of the same joint taken on the line VI—VI in FIG. 5;

FIG. 7 is a detail in section taken on the line V—V in FIG. 5;

FIG. 16 is a view similar to that of FIG. 5 of a third alternative embodiment of a joint according to the invention;

FIG. 17 is a cross-sectional view taken on the line XVII—XVII in FIG. 16;

FIG. 18 is a cross-sectional view taken on the line XVIII—XVIII in FIG. 16;

Figure 2:
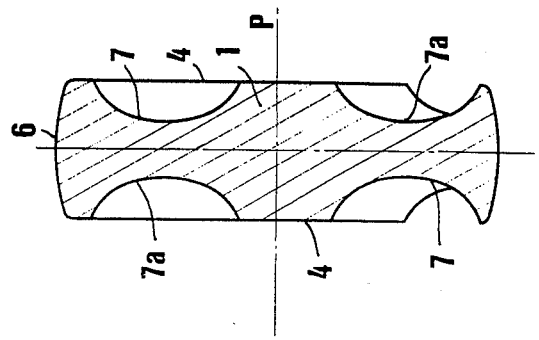
FIG. 2 is a cross-sectional view taken on the line II—II in FIG. 1.
Figure 1:
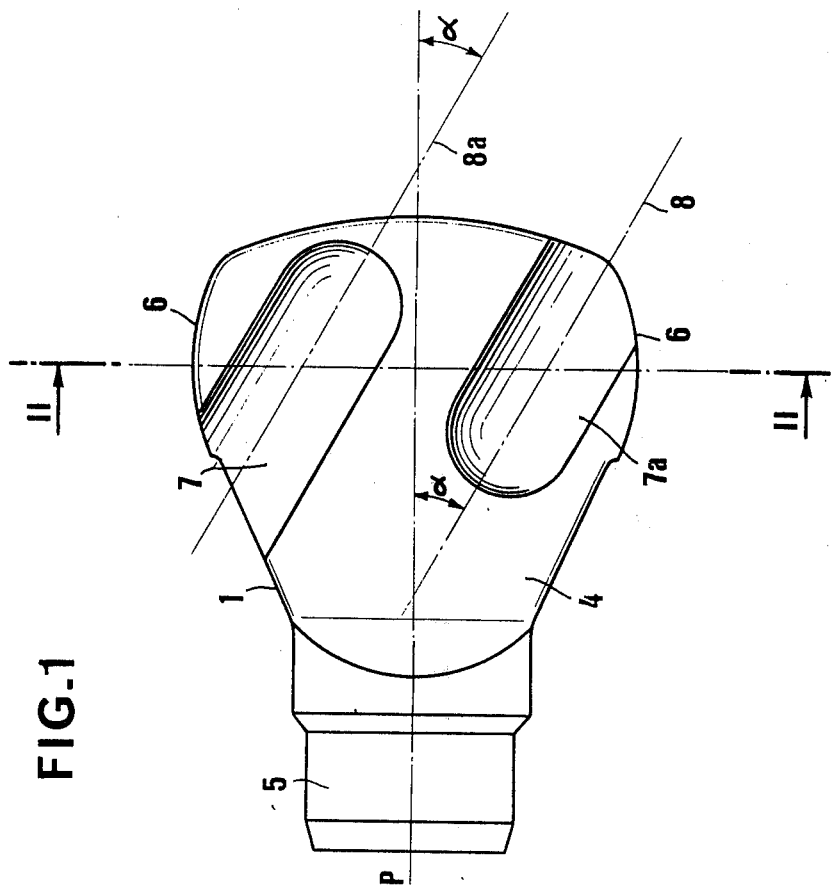
FIG. 1 is a side elevational view of one of the main parts or so-called paddle member of a joint according to a first embodiment of the invention.

FIGS. 1–9 illustrate a first embodiment of the present joint in which power transmitting member with spherical surfaces comprise four balls. This joint comprises a first main part or paddle member 1 (FIGS. 1 and 2) and a second main part or sleeve member 2 (FIGS. 3 and 4) between which the interconnection is ensured by balls 3, 3a (see FIGS. 5–7). The paddle member 1 (so called because of its overall configuration) is generally of trapezoid (U.S.) or trapezium (U.K.) shape joined at its small base to a shaft member 5 adapted to be welded to one of the transmission shafts 9 (FIG. 6). The paddle member 1 has spherical surfaces 6 along its "lateral sides". Along the major or large faces 4 of the paddle member, linear grooves 7, 7a are formed which are adapted to receive balls 3, 3a and for this purpose are of part-circular cross-section of a diameter slightly greater than that of the balls 3, 3a. The axes 8, 8a of the grooves make an angle $\alpha$ with the plane P passing through the axis of revolution of the shaft member 5 and perpendicular to the faces 4 of the paddle member. The sleeve member 2 is formed as a bell-shaped element, the cross-section of which is a rectangle and the closed end of which is provided with a circular opening 10 which enables the sleeve member to be fitted on a collar 11 which is internally splined, the sleeve member being welded thereon ensuring the connection between the sleeve member and the other transmission shaft (not shown). The short sides 12 of the sleeve member 2 have planar internal surfaces 13. Grooves 14, 14a are provided in each of the long sides, that is, four grooves in all adapted to receive the balls 3, 3a and therefore having a part-circular cross-section the diameter of which is substantially equal to that of the grooves 7, 7a formed in the paddle member 1. The longitudinal axes 15, 15a of the grooves 14, 14a make with the plane P' passing through the axis of revolution of the collar 11 and parallel to the short sides 12 of the sleeve member an angle $\alpha$, i.e. an inclination or slope opposite to that of the axes 8, 8a of the grooves 7, 7a formed in the paddle member 1.

As shown in FIGS. 5 and 6, the paddle member 1 is received in the sleeve member 2 such that the spherical surfaces 6 of the paddle member come in tangential contact with the planar interior surface 13 of the short sides of the sleeve member, the balls 2 being received in the grooves 7 of the paddle member and the grooves 14 of the sleeve member, respectively, the balls 3a on the other hand are received in the grooves 7a of the paddle member and the grooves 14a of the sleeve member, respectively, pairs of grooves 7 and 14 or 7a and 14a receiving the same ball 3 or 3a; when the longitudinal axes of the shaft 6 and the collar 11 are in alignment (FIG. 5) an angle $2\alpha$ is formed between the pairs of grooves.

If drive torque C (FIG. 6) is applied on the paddle member, the transmission of the torque to the sleeve member is effected by the balls 3 along (upper right-hand ball and the lower left-hand ball, FIG. 6) which transmit the effective drive force F. If the torque applied to the paddle member is in the opposite direction, the balls 3a become operative to transmit the same.

Figure 8:
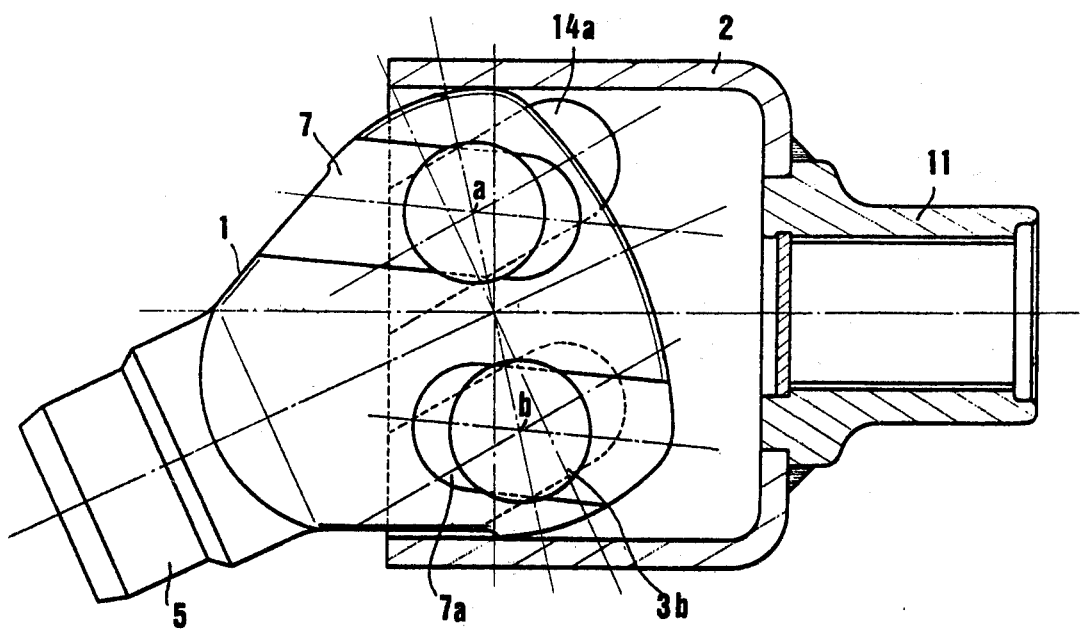
FIG. 8 is a view, partly in elevation and partly in longitudinal cross-section of the joint in FIG. 5 taken in the direction of the arrow VIII in FIG. 6, the parts shown running at an angle, that is, making an angle between the longitudinal axes thereof.
Figure 9:
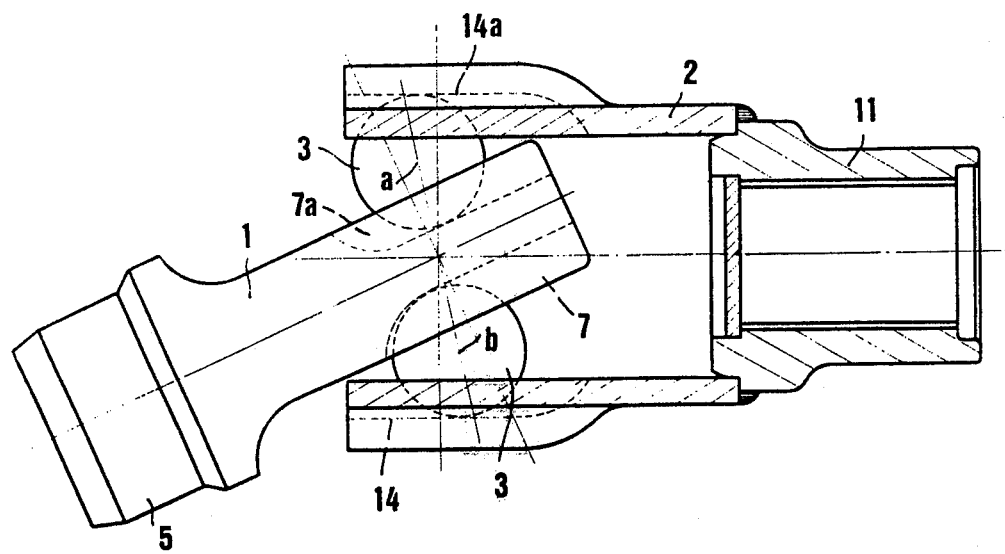
FIG. 9 is a view similar to that of FIG. 8 but taken in the direction of the arrow IX in FIG. 6.

FIGS. 8 and 9 illustrate the manner of operating the joint when the axes of the shaft member 5 joined to the paddle member 1 and the collar 11 jointed to the sleeve member 2 make an angle (different from 180°) between each other, i.e., when the joint runs at an angle. The balls 3 and 3a are displaced in their respective grooves without their torque transmitting action being modified, the centers of the balls which physically form the points of intersection a and b of the axes of revolution of the grooves 7, 14 and 7a, 14a always remain in the bisector plane, that is, the plane bisecting the angle formed between the above-mentioned axes as will be demonstrated hereinafter.

The joints thus constructed has a basic advantage over known joints of a similar type in which the transmission of a torque is ensured by members having spherical surfaces such as balls provided for displacement in linear grooves or channels formed in the main parts integral with the driving and driven shafts respectively, in that the present joint is of perfect constant velocity operation irrespective of the precision in the assembly of the joint, as will be explained hereinafter; this perfect constant velocity operation is accompanied with several other advantages.

Figure 10:
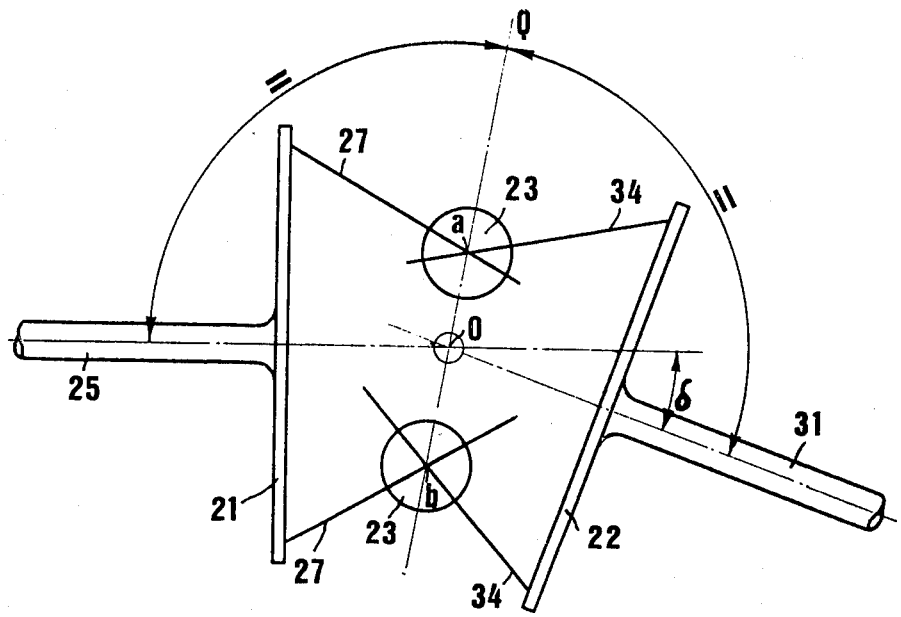
FIGS. 10 and 11 are schematic views of a known four-ball type universal joint in two different operating positions.
Figure 11:
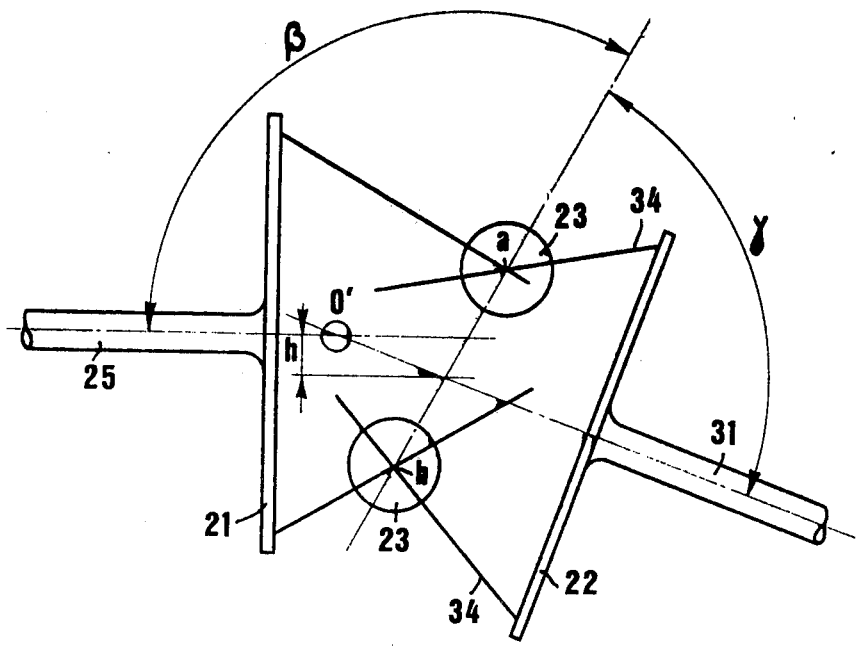

For the purposes of demonstration, a known type of four-ball universal joint is illustrated in FIGS. 10 and 11. In these figures to designate parts corresponding to those of FIGS. 1–9 the same reference numerals are used increased by twenty; only torque transmitting members for a single direction of rotation of the joint are shown. The prior art joint comprises a first main part 21 integral with a shaft 25 and a second main part 22 integral with a shaft 31, the interconnection between parts 21 and 22 being effected by balls 23 each guided in a groove 27 formed in the main part 21 and a groove 34 formed in the main part 22, the grooves 27 and 34 being represented schematically by their longitudinal axes. It is noted that in the prior art joint, the grooves 27 of the main part 21 as well as the grooves 34 in the part 22 are convergent instead of, as is the case with the joint according to the invention, the grooves 7 in the paddle member 1 and the grooves 14 in the sleeve member 2 being respectively parallel to each other. When, as is shown in FIG. 10, the axes of the shafts 25 and 31 form a certain angle $\delta$ between each other, the axes intersect each other at a point O and the centers a and b of the two balls 23 are located in the bisector plane Q the angle formed by the axes of the two shafts.

If, for any reason whatever such as too much initial play or wear after a certain amount of use, a relative radial displacement h of the two shafts is produced (FIG. 11) the point of intersection of the axes of the shafts is displaced to a point O' and the balls 23 take the position shown in the figure. It is therefore clearly seen that the straight line which joins the centers a and b of the balls 23 is no longer in the bisector plane bisecting the angles formed by the axes of the shafts 25 and 31; the angle $\beta$ that this straight line makes with the axis of the shaft 25 becomes greater than the angle $\gamma$ that the same straight line makes with the axis of the shaft 31. Consequently, the joint is no longer of constant velocity operation, i.e. during rotation of the joint, the relative angular setting of the shafts undergoes a cyclical fluctuation at the rate of two cycles per revolution.

The consequences of this are as follows:

a. to attain perfect constant velocity operation with such a joint, it is necessary to ensure perfect radial centering of the two shafts by means in addition to the balls for torque transmission;

b. during the application of drive torque, for example on the shaft 25, in case the shafts 25 and 31 are running at an angle, the shafts tend to move away from each other radially in the direction of the displacement h with a force which may be of the same order of magnitude as the effective drive force applied to the torque transmitting balls. Therefore, to radially retain the shafts 25 and 31 relative to each other, it is necessary to add to this joint, a powerful centering mechansim or other balls which are used only for centering the joint which create much more additional friction and heat as well as complicate the manufacture of the joint;

c. when the joint runs at an angle, the above-mentioned radial force manifests itself cyclically, changing direction four times per revolution relative to the parts of the joint. Consequently, if there is the slightest play resulting from manufacture or wear, there is knocking during operation;

d. Moreover, in this type of known joint, the angle of intersection of the grooves or channels 27 and 34 located at the upper part of FIG. 11 at point a is different from the angle of intersection of the grooves or channels 27 and 24 located at the bottom of FIG. 11 at point b. This results in the sliding friction of the balls in their respective grooves, which increases as the angle of intersection of the grooves increases, being different. The displacement of the two balls with respect to the upper grooves, on one hand, and the lower grooves, on the other hand, being in opposite directions, the resultant sliding friction forces of the balls projected on the axis of the shaft 25 or 31 will be relatively large and will vary cyclically during rotation of the joint. A significant axial pulsation is therefore exerted on the shafts, which is a serious disadvantage, namely when the joints of this type are employed on front drive motor vehicles.

Figure 12:
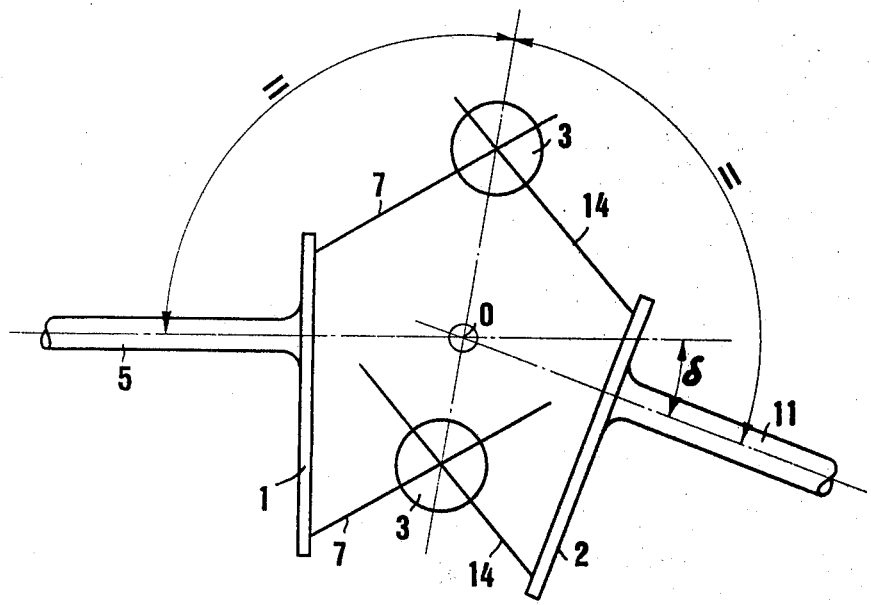
FIGS. 12 and 13 are similar views for a joint according to the invention.
Figure 13:
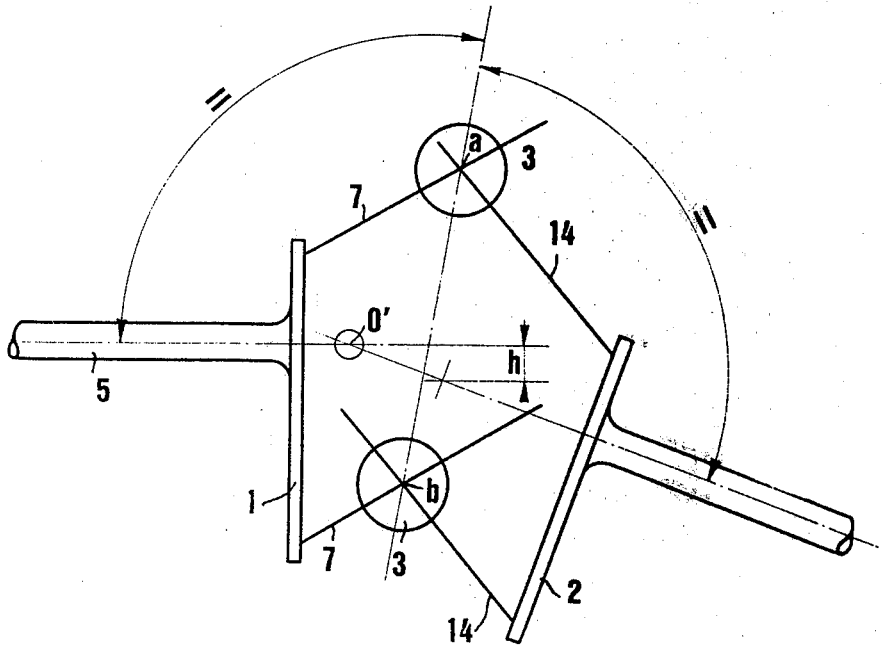

In a joint according to the invention, such as schematically illustrated in FIGS. 12 and 13 in which the same reference numerals are used as in FIGS. 1–9, the axes of the grooves formed in the main part or paddle member 1 are parallel to one another which is likewise the case of the grooves 14 in the main part or sleeve member 2, the slope or angle of inclination $\alpha$ with respect to the respective shafts 5 and 11 being the same for the grooves 7 and the grooves 14 which results in the grooves 7 and 14 intersecting in each case, at an angle of $2\alpha$ when the shafts are in alignment. When the shafts 5 and 11 run at an angle $\delta$ as shown in FIG. 12 the balls 3 are in position, as already mentioned, in the bisector plane bisecting the angles formed by the axes of the shafts. If, as considered with respect to the prior art joint in FIG. 11, there is a relative radial displacement $h$ of the two shafts, it is seen (FIG. 13) that the two balls 3 are displaced laterally in the same plane and remain along a straight line parallel to the bisector plane. Consequently, by geometry the angle of intersection of the axes of the grooves 7 and 14 is the same at points $a$ and $b$ in FIG. 13.

The following advantages are thus obtained:

1. The joint according to the invention remains of perfect constant velocity operation, independently of the play resulting from manufacture or wear which may bring about a radial shifting of the two shafts;

2. No substantial radial force between the two shafts is produced and therefore no special mechanism is necessary to take up the radial forces between the shafts. A great simplification of the construction results, as well as a decrease in production cost and a reduction in heating by improved efficiency;

3. There is no radial cyclical force which thereby produces perfectly silent operation even when there is play resulting from manufacture or wear;

4. Greater axial sliding freedom is possible without the slightly cyclical axial pulsations, owing to the precise compensation for the sliding friction of the two balls, the displacements of the balls in opposite directions being effected with equal forces;

5. Besides the excellent operating characteristics enumerated above, there is a great advantage insofar as the industrial manufacture of the joint according to the invention is concerned which results from the parallel arrangement of the grooves and from the fact that the joints themselves admit of a certain degree of manufacturing imprecision. Indeed, the parallel grooves of the sleeve member may be obtained by stamping a tube which is subjected to pressure directly inwardly against an internal mandral, taking into account the parallel arrangement of the four grooves. If necessary, single step broaching enables the grooves to be quickly finished in the event that the sleeve member is very short and that the grooves open to the outside at the free outer end of the sleeve member.

The four grooves in the paddle member may be cold punched simultaneously along the four faces thereof without any difficulty in an ordinary press and without necessitating subsequent finition after case hardening treatment. Indeed, from the fact the joint of the invention may be constructed with a certain degree of play it is not necessary to form the parts with a high degree of precision which makes it possible to accept the difference in dimension which may exist between the final cold formed part and the same part after heat treatment.

These various advantages are eminently favorable to production line manufacture of the joint according to the invention at low production costs while at the same time constantly ensuring excellent quality and great reliability in finished mechanisms.

Figure 14:
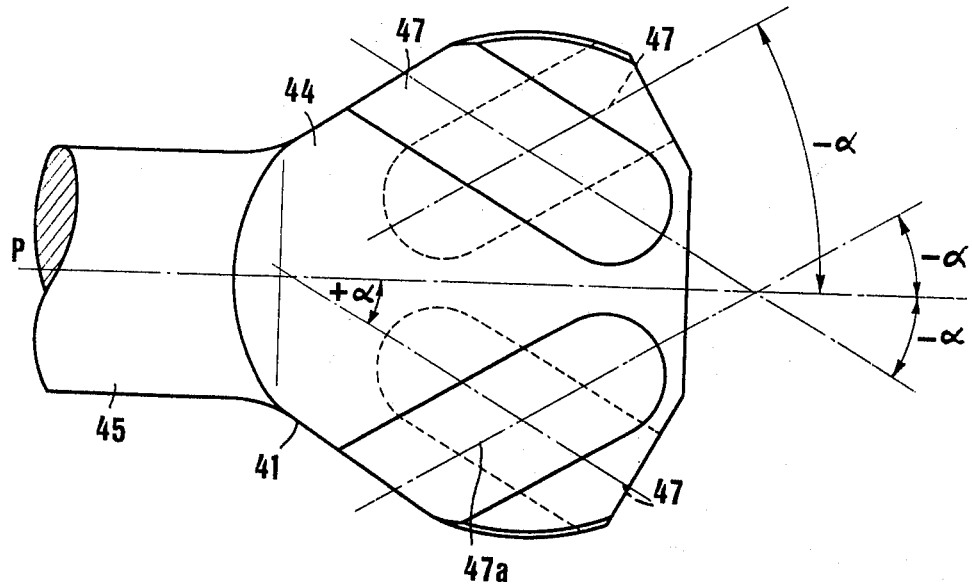
FIG. 14 is a view similar to that of FIG. 1 of paddle member of an alternative embodiment.

In the embodiment of FIGS. 1–9 employed in the preceding demonstration, the axes of the four grooves formed in the paddle member are parallel to one another; likewise the axes of the four grooves in the sleeve member are parallel to one another. Nevertheless, the angles of inclination of the second group of grooves are opposite those of the first. Such a parallel arrangement is, however, not essential; indeed, it merely suffices for the diagonally opposed grooves formed in the paddle member to be parallel in pairs, two-by-two, and the same with the opposite angle of inclination, the corresponding grooves formed in the sleeve member. Such an embodiment is illustrated in FIG. 14 which shows a paddle member 41 forming the extension of a shaft 45 in which are formed, in its two respective faces, two diagonally opposed and parallel grooves whose axes make an angle $+\alpha$ with the plane P passing through the axis of the shaft 45. On the other hand, the two other grooves 47a formed along the other diagonal of the paddle member are also parallel but make an angle $-\alpha$ with the plane P. Naturally, the sleeve member is formed in the corresponding manner, the grooves of the sleeve member cooperating with the grooves 47 by means of the power transmitting balls being parallel to each other and making an angle $-\alpha$ with the plane P of the sleeve member, whereas the grooves which cooperate with the grooves 44a in the paddle member are also parallel to each other and make an angle $+\alpha$ with the plane P.

Figure 15:
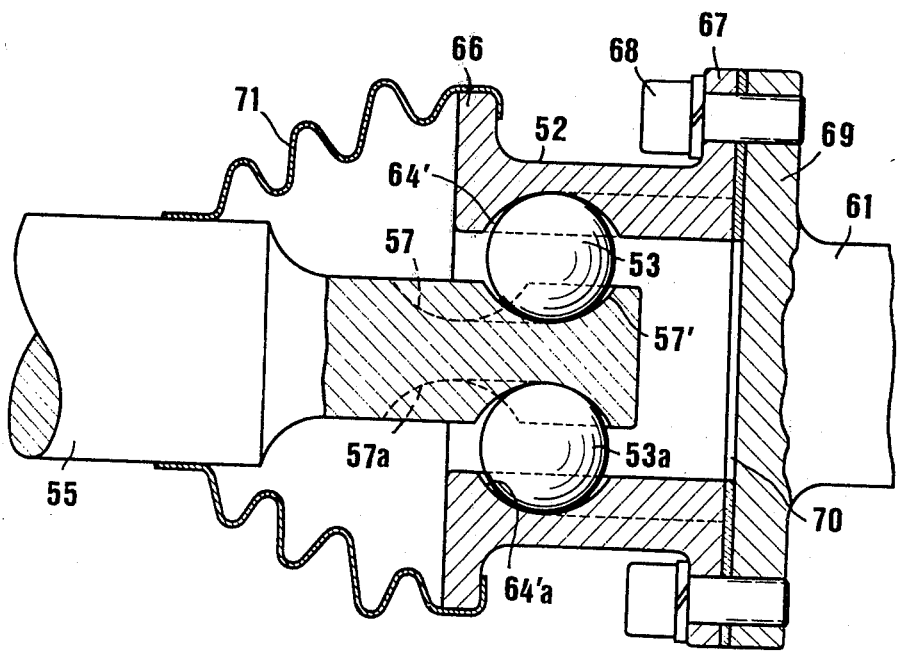
FIG. 15 is a longitudinal sectional view of another alternative embodiment of a joint according to the invention.

FIG. 15 illustrates a particular embodiment which has various advantages from the viewpoint of construction as well as of use. As shown in FIG. 15, the joint comprises a paddle member 51 at the end of a shaft 55 and in which are formed, as previously described, parallel grooves 57 and 57a. Nevertheless, instead of one of their ends being opened as was the case with the grooves 7 and 7a in the embodiment of FIGS. 1–9, the grooves 57 and 57a terminate at both their ends in spherical end portions. The sleeve member cooperating with the paddle member comprises a sleeve 52 of rectangular cross-section along the interior surface of which grooves 64 and 64a are formed, these grooves 64 and 64a receiving with grooves 57, 57a in the paddle member the power transmitting balls 53, 53a. The grooves 57, 57a are open at one of the ends of the sleeve 52. The sleeve 52 has flanges 66, 67 at its ends and is fixed, by means of bolts 68 in bores specially formed in the flange 67, against a flange or plate 69 formed at the end of the shaft 61 which the joint connects to the shaft 55. A closure plate 70 is glued or otherwise sealingly fixed to the flange 67. Further, a sealing bellows 71 is fastened by known means (not shown) at one end about the shaft 55 and at the other end along the periphery of the flange 66. The joint thus made up is completely closed and therefore may be entirely assembled and filled with lubricant before being fastened to the flange 69. In addition, it may be stored in advance of this last assembly step which may be carried out, for example, on a motor vehicle production line. Moreover, for effecting the assemblage of the joint per se, the paddle member is inserted in the sleeve 52 until the paddle member traverses the sleeve, this step being carried out before the closure plate 70 is put into place. The balls 53, 53a are then positioned in the grooves 57 and 57a and the paddle member is withdrawn in the opposite direction while the balls are received in the grooves 64, 64a until the paddle member returns to its normal operating position after which the closure plate 70 is put into place. The dropping out of balls which may result from too rapid a displacement of the paddle member in the sleeve member, either towards the right in FIG. 15 or towards the left, is prevented, in the first case, by the abutment at the end of the paddle member against the plate 70, and in the second case, by the abutment of the balls 53, 53a against the end portions 57' of the grooves of the paddle member and against the end positions 64' of the grooves in the sleeve member.

FIGS. 16–18 show, in three views similar to those of FIGS. 5–7, an embodiment in which all of the sliding displacement of the paddle member relative to the sleeve member, and therefore of the input shaft relative to the output shaft, is prohibited. The constituent parts and the arrangement of the joint, except for the sleeve member, are the same as those of the embodiment of FIGS. 1–9, and therefore the corresponding parts are designated by the same references as in FIGS. 1–9. The sleeve member 72 is slightly shorter than the sleeve member of the joint of FIGS. 1–9 and its short sides are of spherical shape at 75 in the vicinity of its open end so as to mate with the corresponding shape of the spherical surfaces 6 of the paddle member; thus the paddle member is longitudinally held against displacement in the sleeve member. By the aforementioned advantages of the invention by which there is a nearly total absence of axial or radial operating pulsations, the pressure exerted by one against the other by the spherical surfaces 6 of the paddle member and the spherical surfaces 76 of the sleeve member are extremely small since they only result from external forces to which the joint is subjected and not from the operation per se of the joint. The contact surfaces 6 and 76 may therefore without any problem have a certain degree of play and, if necessary, may be formed of parts of plastic material such as nylon. It is realized that in this nonsliding embodiment, the running angle may without any difficulty reach values in the order of 45°.

Figure 19:
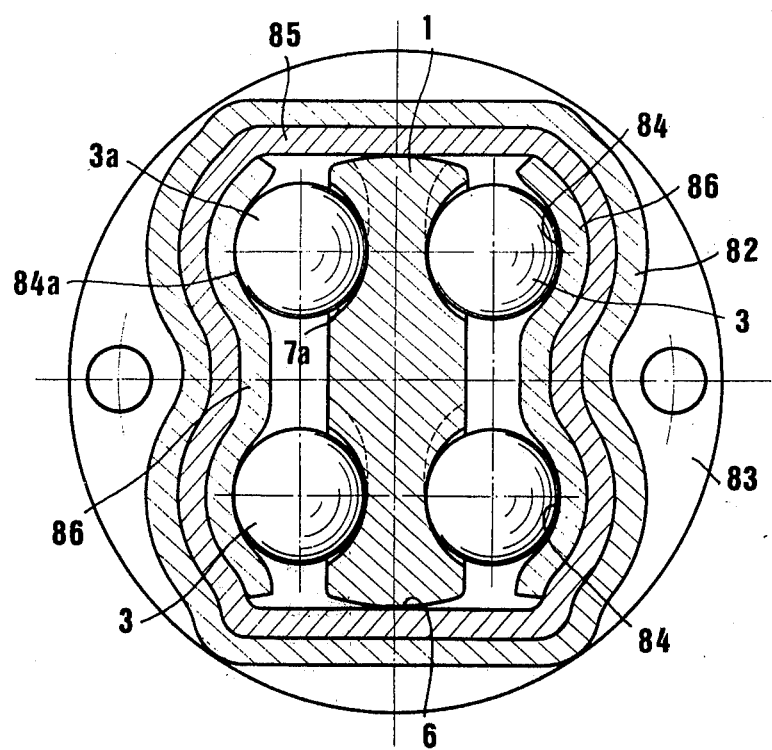
FIG. 19 is a cross-sectional view of a fourth alternative embodiment.

FIG. 19 illustrates an embodiment of the sliding type in which the sleeve member 82 provided with a fastening flange 83 and obtained by stamping contains a sleeve 85 of elastomeric material inside which small lateral plates 86 are secured. Grooves 84, 84a are formed in the small lateral plates 86, for example also by stamping, and are adapted to receive the balls 3, 3a. The elastomeric sleeve 85 may be heat injected between the interior surface of the sleeve member and the small lateral plates 86 (complementary small plates extending from the other small plates along the short sides of the sleeve member must then be provided during this injection), or molded beforehand and mounted under mechanical pressure, the sleeve and the small plates 86 being held by the pressure exerted on the small plates by the balls 3, 3a during the introduction of the paddle member 1 into the sleeve member. When the joint runs at an angle, the spherical surfaces 6 of the paddle member slide with a slight compression stress along the corresponding smooth interior surfaces 87 of the sleeve 85.

Thus, the paddle member 1 and the shaft which is integral therewith are insulated from the outer sleeve member 82 insofar as high frequency vibrations are concerned. Further, the manufacture of the joint thus formed is simplified and its production cost is not as great.

Figure 20:
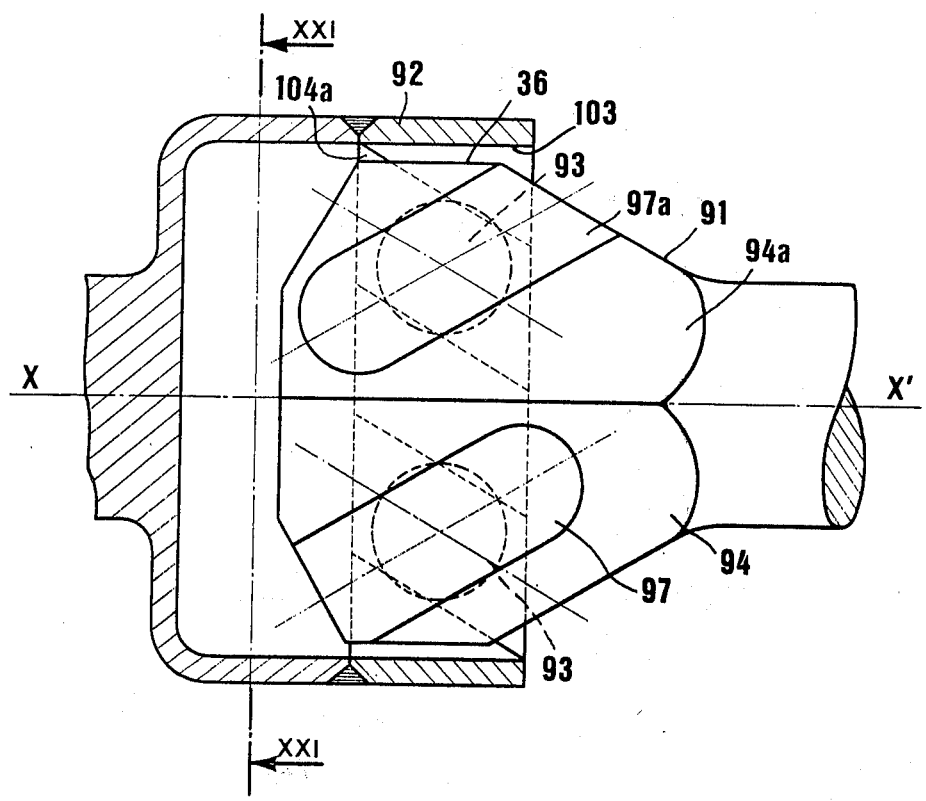
FIG. 20 is a view similar to that of FIG. 5 of a fifth alternative embodiment.
Figure 21:
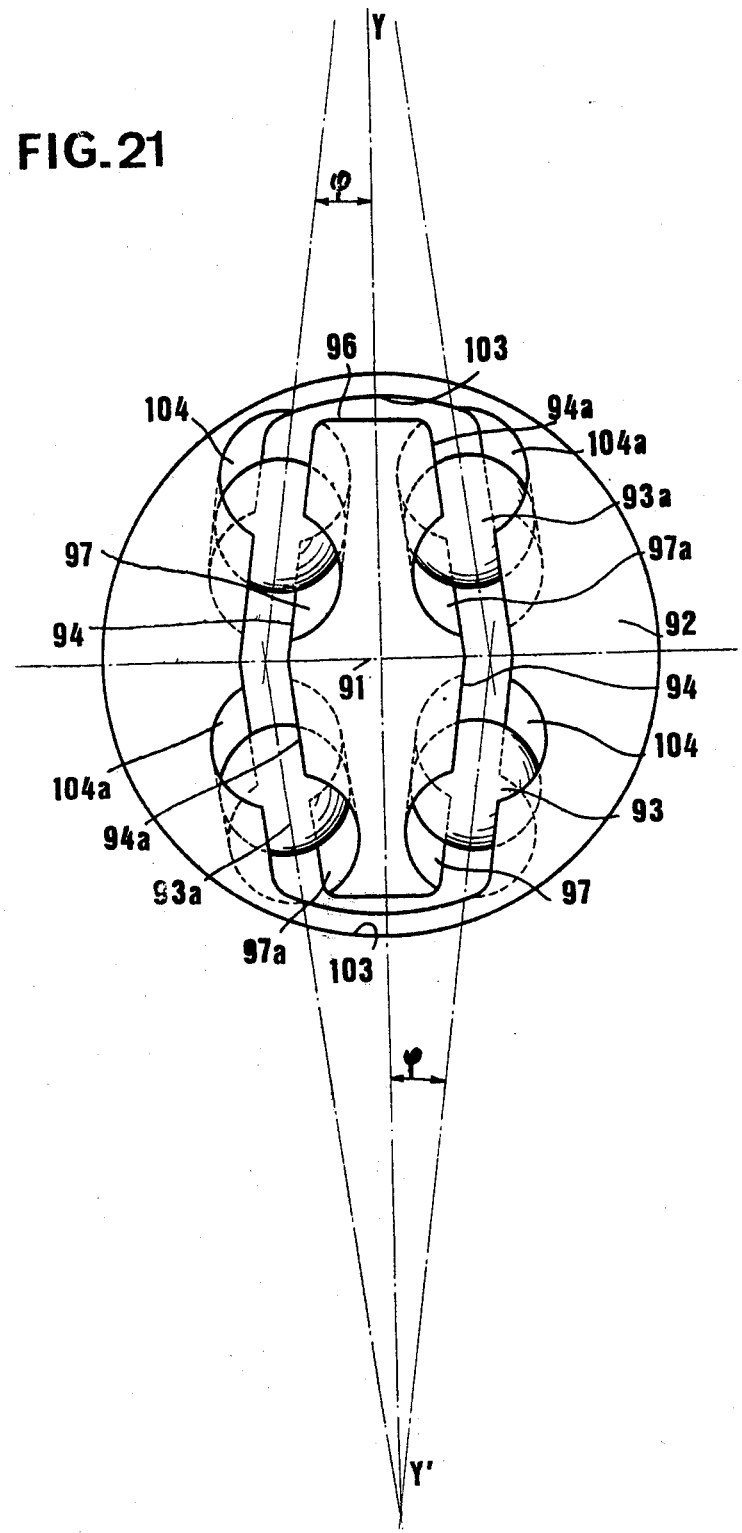
FIG. 21 is a schematic view of FIG. 20 in section taken on line XXI—XXI in FIG. 20.

FIGS. 20 and 21 illustrate another embodiment of the present joint in which the major faces of the paddle member 91, instead of being flat, form a dihedral angle the planes 94 and 94' of which make a certain angle with the main plane Y, Y' (FIG. 21) of the joint, the sleeve member having a corresponding interior shape. Consequently, the axes of the grooves 97, 97a of the paddle member and the axes of the grooves 104, 104a of the sleeve member, respectively parallel to one another, make an angle $\phi$ with the plane Y, Y'. The radial position of the paddle member 31 with respect to the sleeve member is thus determined without it being necessary to provide contact between the short sides 96 of the paddle member and the corresponding interior surfaces 103 of the sleeve member. The manufacture of the paddle member is thus greatly simplified by the fact that spherical surfaces are no longer formed on the short sides. As the radial force between the paddle member and the sleeve member is extremely small, there is no overloading of the balls 93 caused thereby.

The angle $\phi$ may be of any value up to 45°.

Figure 22:
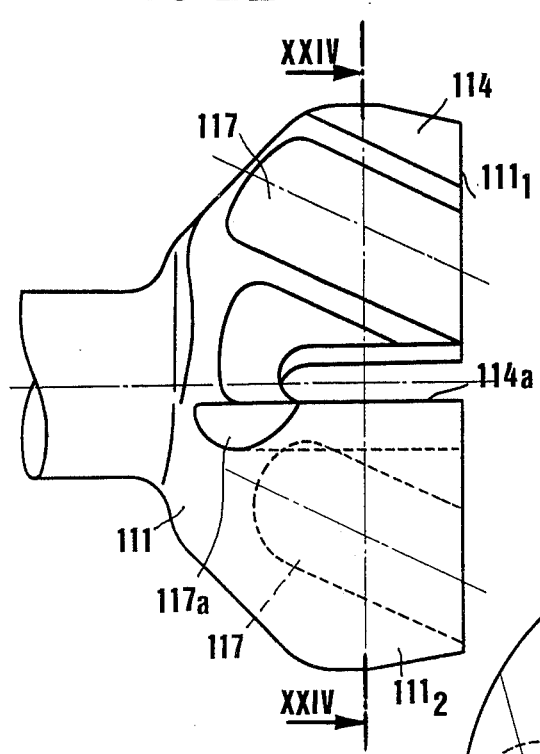
FIG. 22 is a side elevational view of a paddle member of a joint constructed according to a variation of the embodiment of FIGS. 20 and 21.
Figure 24:
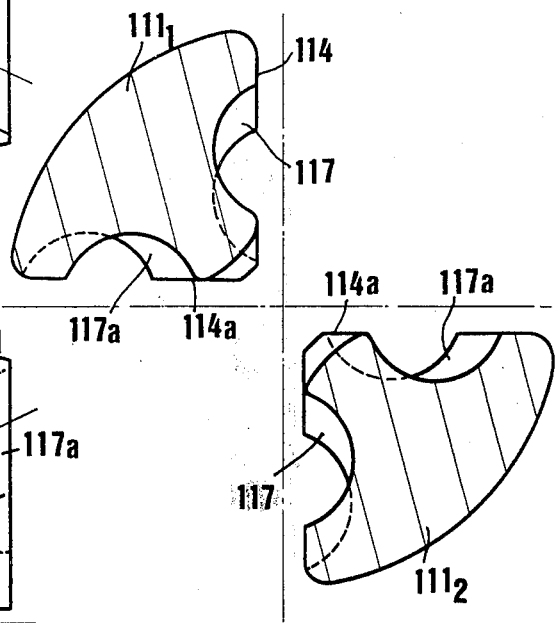
FIG. 24 is a cross-sectional view taken on the line XXIV—XXIV in FIG. 22.
Figure 23:
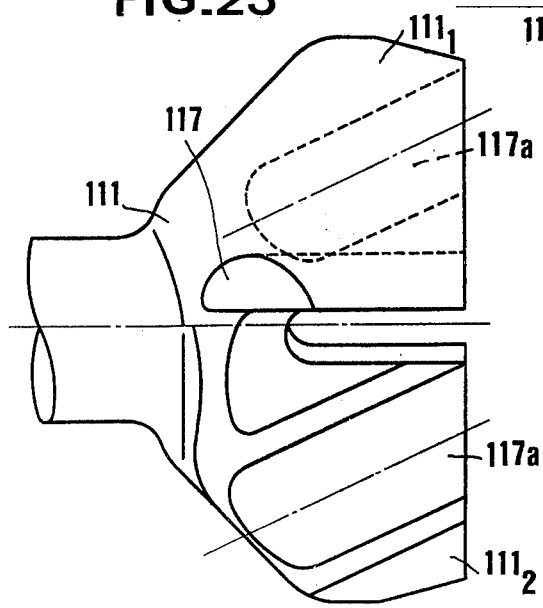
FIG. 23 is a side elevational view of the same paddle member rotated 90° about its longitudinal axis.

The embodiment illustrated in FIGS. 22, 23 and 24 corresponds to the previous embodiment, but in the former, the edge of the dihedral angle that each of the faces 114, 114a of the paddle member 11 forms, instead of projecting with respect to the body thereof, is recessed and the intersection of the longitudinal axes of the grooves 107, 107a of the paddle member with the median plane Y, Y' of the paddle member forming the angle $\phi$ is located along the longitudinal axis of the paddle member. The paddle member is fork-shaped here with two arms $111_1$ and $111_2$ each triangular in cross-section. The other main part of the joint (not illustrated) instead of being a sleeve member may be a second main part identical to the paddle member 111 which enmeshes with the latter so that the median plane of the second paddle member is perpendicular to the median plane Y, Y' of the first paddle member. The forming of paddle members of this construction is slightly more difficult to carry out but it has the advantage of requiring only a single type of main part to manufacture.

Figure 25:
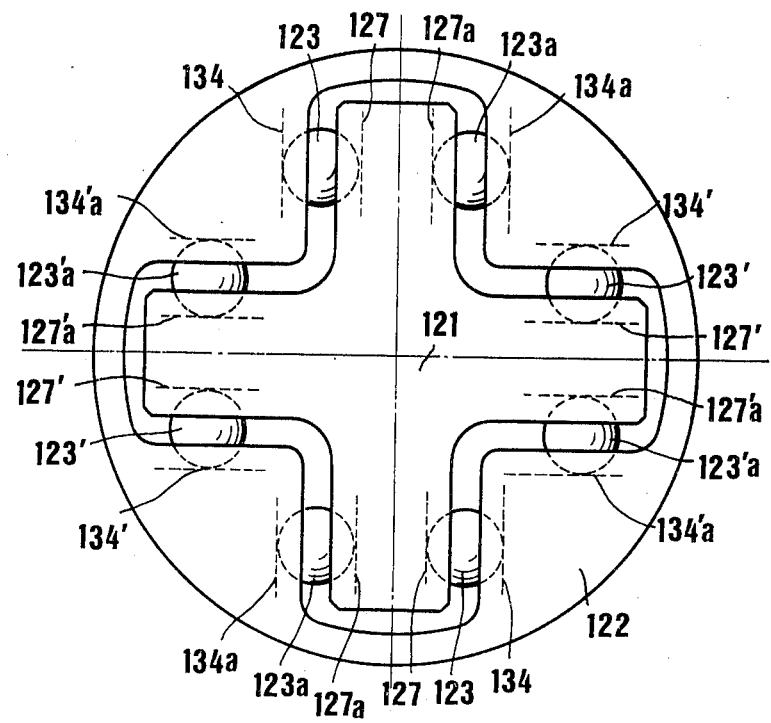
FIG. 25 is a schematic end view of a modification of the universal joint according to the invention comprising two sets of four balls, part of the sleeve member being cutaway.

All the preceding embodiments comprise two pairs of balls and therefore two pairs of guiding grooves for the balls in each of the main parts (paddle member and sleeve member), or in the case of the embodiment of FIGS. 22–24 only two paddle members. It is nonetheless possible to employ within the scope of the invention a greater number of pairs of balls. Thus, FIG. 25 schematically illustrates a joint provided with four pairs of balls 123, 123a, 123' and 123'a. The paddle member and the corresponding interior volume of the paddle member 121 and of the sleeve member 122 then have a cross-shaped cross-section. The grooves formed in the two main parts which are only represented by their generatrices located at their maximum depth, are parallel to each other in pairs 127—127, 127a—127a, 127'—127' and 127'a—127'a in the paddle member 121 and to each other in pairs 134—134, 134a—134a, 134'—134', 134'a—134'a in the sleeve member.

One could therefore conceive of a joint according to the invention which comprises only a single pair of balls and therefore a single pair of diagonally opposed grooves in each of the two main parts (paddle member-/and sleeve member) in the event that power transmission is only a single direction of rotation is desired.

FIGS. 26–30 concern another mode of the invention in which the balls effecting power transmission between the two main parts are replaced by rollers which are mounted on spindles (trunnions) integral with one of the main parts and held captive between two parallel grooves formed in the other main part.

Figure 26:
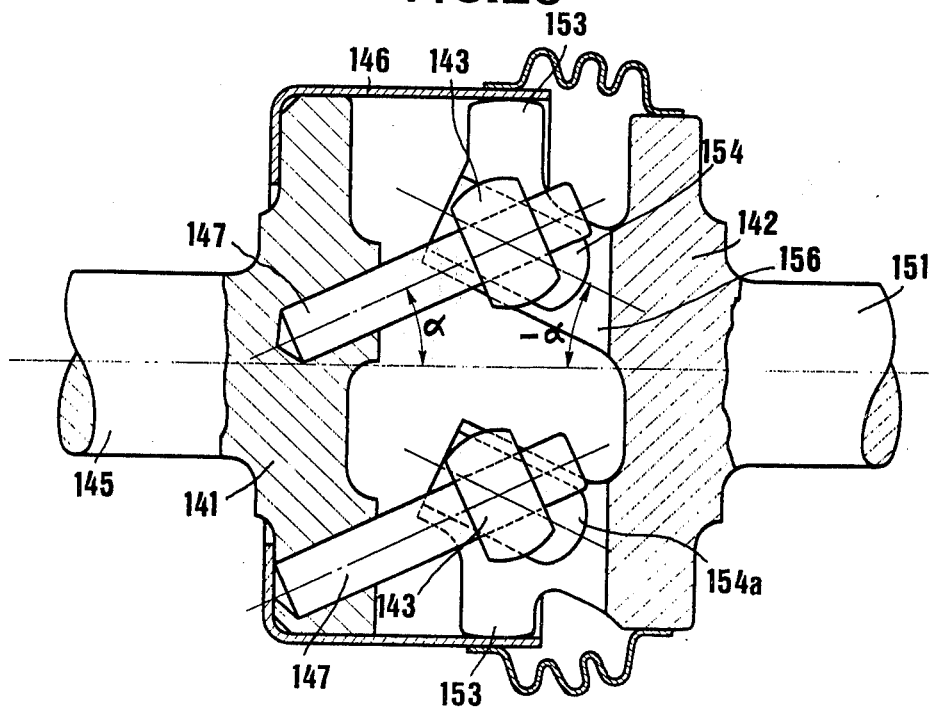
FIG. 26 is a longitudinal sectional view of a modification of the joint according to the invention in which the balls are replaced by rollers rotatably and slidably mounted on spindles integral with one of the main parts.

Thus, the joint illustrated in FIG. 26 comprises two main parts 141 and 142 integrally formed with shafts 145 and 151, respectively, between which rotational movement is to be transmitted at a variable angle of the axes of the two shafts. Two spindles 147 are held in place in the main part 141 and make angles + $\alpha$ with the longitudinal axes of the shaft 145. A roller 143 is mounted for free rotational and sliding movement on each of the spindles, the rolling surface of the roller being a part-spherical zone. Each roller 143 is enclosed in two grooves 154, 154a (only one of the grooves appearing in FIG. 26 for each of the rollers) formed opposite one another in projections 156 extending from the main part 142 towards the main part 141, the grooves having an arcuate cross-section the diameter of which is slightly greater than that of the rolling surface of the rollers 143 and centered approximately along the common longitudinal axis of a pair of facing grooves. The common longitudinal axis of the pairs of grooves 154, 154a makes an angle $-\alpha$ with the axis of the shaft 151 with which the main part 141 is integrally formed. Each projection 156 has a lateral lug with a spherical outer surface which bears against the interior of a bell or sleeve member 146 fixed to the main part 141 which ensures the relative radial maintenance of the shafts. A sealing bellows or member 155 secured by known means (not illustrated) to the periphery of the main part 142 and to the bell member 146 retains lubricant in the joint and prevents dust, mud and other harmful impurities from entering the joint.

The operation of the above described joint is exactly the same as that of the joint illustrated in the preceding figures, as explained with respect to FIGS. 12 and 13; the spindles 147 have the same function as the guiding paths and replace the grooves 7, 7a or 27, 27a etc. . . . of the embodiments of FIGS. 1–9, etc. . . .

Figure 27:
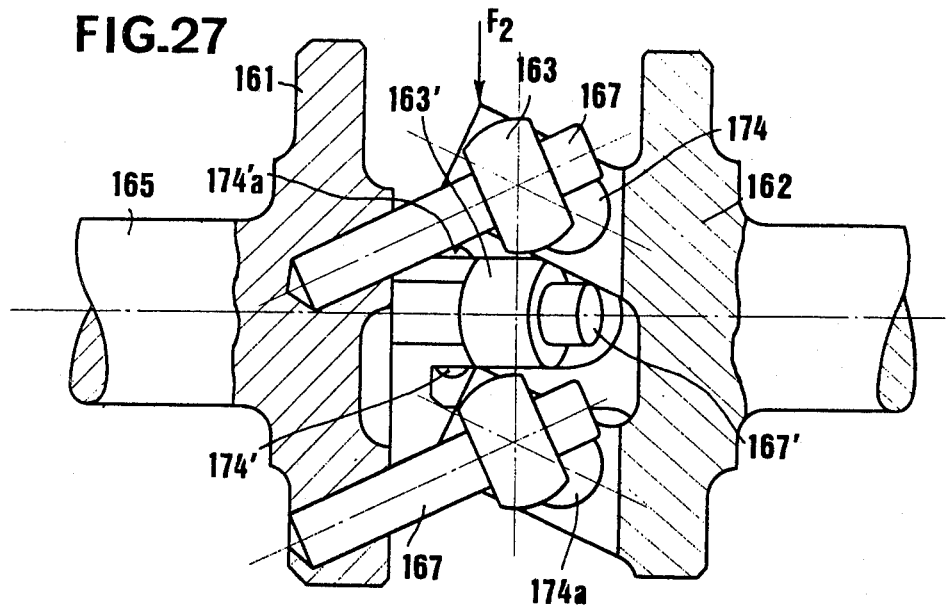
FIG. 27 is a view similar to that of a last modified embodiment viewed in the direction of the arrow $f_1$ in FIG. 28.
Figure 28:
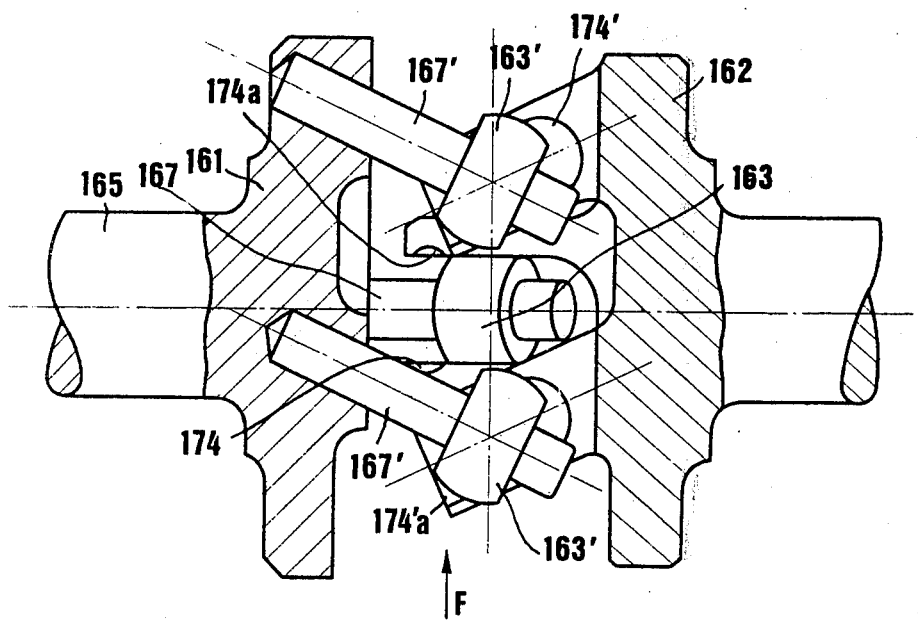
FIG. 28 is a similar view taken in the direction of the arrow $f_2$ in FIG. 27.

As previously discussed with respect to the above-described ball type universal joints, two or more pairs of rollers may also be utilized. FIGS. 27 and 28 correspond to a joint comprising two pairs of rollers 163, 163' carried by two pairs of spindles 167, 167' fixed to a first main part 161 and offset 90° from one another about the axis of the corresponding shaft 165; the rollers cooperate with four pairs of grooves 174–174a, 174', 174'a formed in the projections 176, 176' integral with the second main part 162. This arrangement not only increases the capacity of the joint for a given overall size, but avoids having recourse to a contraption for the relative maintenance of the shafts.

Figure 29:
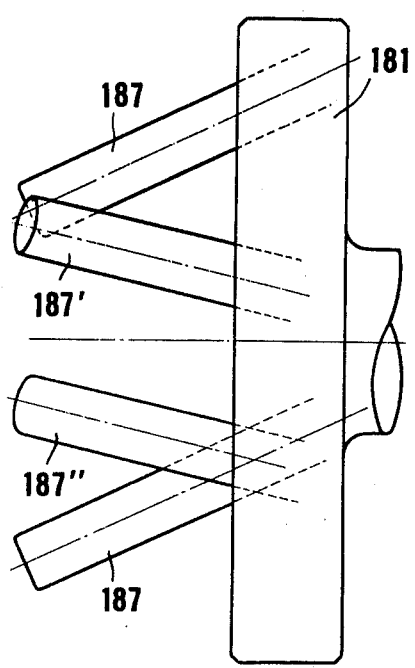
FIG. 29 is a side elevational view of one of the main parts of a variation of the joint according to FIG. 26.
Figure 30:
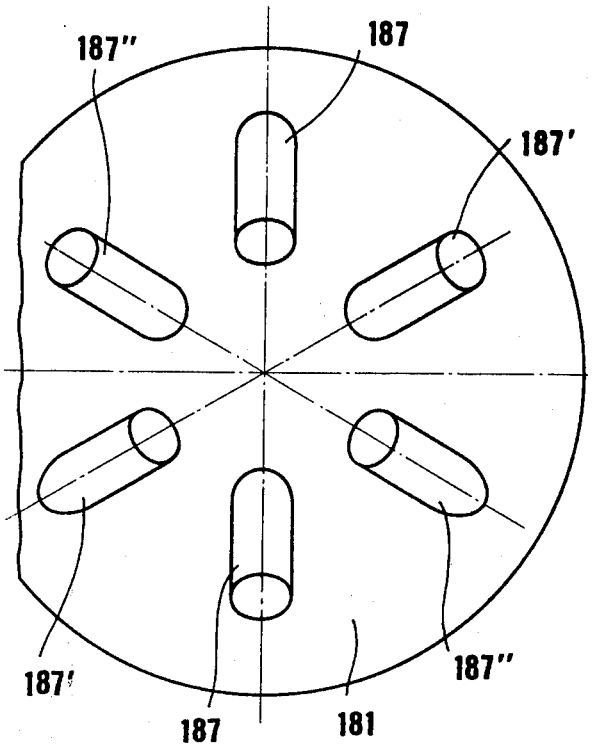
FIG. 30 is a front view of the part in FIG. 29.
Figure 31:
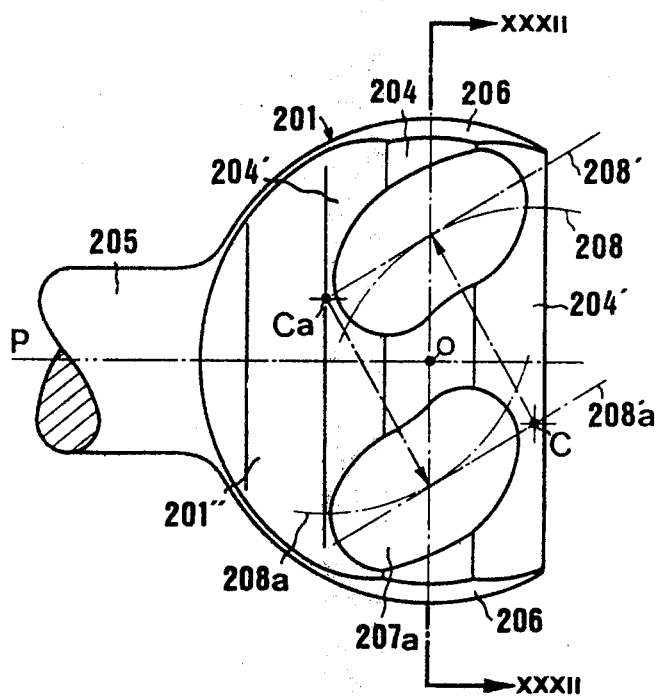
FIG. 31 is a side elevational view of the paddle member of the present joint according to a still further embodiment.
Figure 32:
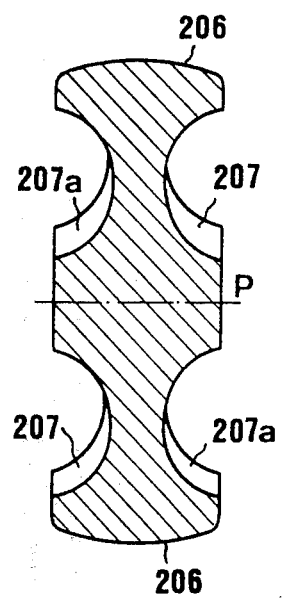
FIG. 32 is a cross-sectional view taken on the line XXXII—XXXII in FIG. 31.

The embodiment of FIGS. 29 and 30 comprises three pairs of rollers (not shown) mounted respectively on three pairs of spindles 187, 187', 187'' offset 60° from one another. This embodiment which is a little more complicated finds advantageous applications in heavy duty applications.

Figure 37:
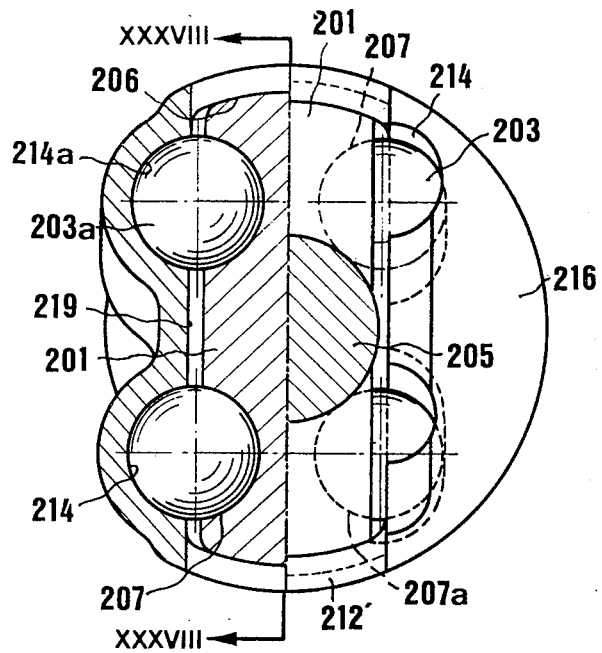
FIG. 37 is a view, half from the end (right side) and half in cross-section (left side) of the entire joint formed by the assembly of the paddle member shown in FIGS. 31–33 with the sleeve member shown in FIGS. 34–36.
Figure 38:
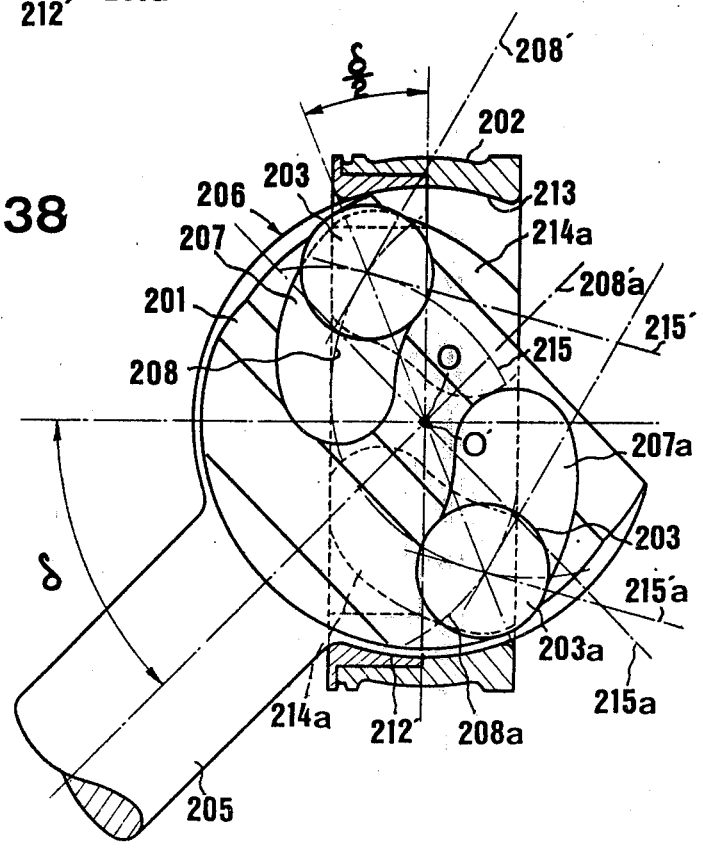
FIG. 38 is a view showing the same entire joint running at an angle, the paddle member being illustrated in elevation and the sleeve member in diametral section.

In the embodiment of FIGS. 31–38, to designate the various elements of the joint according to the invention, the same basic references are used as in the embodiment of FIGS. 1–9, increased by 200. As illustrated in the figures, the joint comprises a paddle member 201 (FIGS. 31–33) which cooperates with a sleeve member 202 (FIGS. 34–36) by means of balls 202 and 203a (FIGS. 37, 38).

The paddle member 201 comprises a body 201' with planar lateral faces 204 and bevelled faces 204', the body 201' being joined by a narrowed portion 201'' to a transmission shaft member 205. The paddle member 201 is, in elevation, part-circular in shape (see FIG. 31) and its lateral sides are formed as part-spherical portions 206. Grooves 207, 207a are formed in the faces 204–204' of the paddle member 201 and are adapted to receive balls 203–203a and for this purpose are part-circular in cross-section, the diameter being slightly greater than that of the balls. The grooves 207, 207a are concave in curvature, the center line 208, 208a of each of the grooves being arcuate and centered at the point C,$C_a$ (see FIG. 31). In accordance with a feature of the invention, the lines 208', 208'a tangent to the center lines 208, 208a of the grooves 207, 207a at respective points located on the straight line passing through the center 0 of the spherical 206 make the same angles with the median plane P of the paddle member and, in the instant embodiment, these lines 208', 208'a are parallel to each other, the grooves 207, 207a being superposed in this case in FIG. 31.

The sleeve member 202 (FIGS. 34–36) comprises a part generally shaped like a frame with short sides 212 whose interior surface 213 has a spherical surface centered at O' (FIG. 34), the radius of this spherical surface being substantially equal to the radius of the outer spherical surfaces 206 of the paddle member. Grooves 214, 214a are formed in the long sides of the sleeve and their shape corresponds to the grooves 207, 207a of the paddle member, the center lines 215, 215a of the grooves 214, 214a being arcs centered respectively at C', C'a, the orientation of the respective grooves being opposite, with respect to the median plane P' of the sleeve member, the orientation of the respective grooves 207–207a of the paddle member 201 with respect to the median plane thereof. In other words, the two sets of grooves have the same curvature; and by considering FIGS. 31–34, the angle of the tangent line 215', 215'a to the center line 215, 215a of the grooves 214, 214a at the point of intersection of this center line with the plane perpendicular to the plane P' passing through the point 0' is equal to opposite in sign to the angle of the tangent line 208', 208'a with the center line 208, 208a of the grooves 207, 207a corresponding to the plane perpendicular to the plane P and passing through the point 0.

Figure 33:
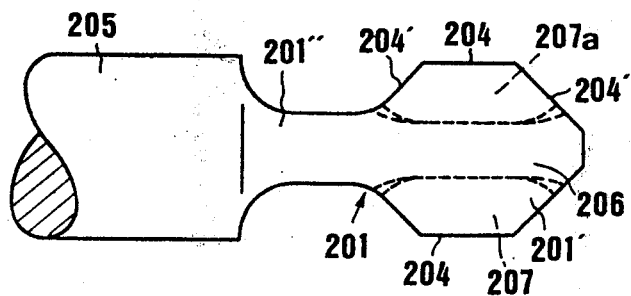
FIG. 33 is a top view of the paddle member such as shown in FIG. 31.

The long sides of the sleeve member have flat interior surfaces between the grooves 214, 214a, the distance between the flat interior surfaces being substantially equal or slightly greater than the distance separating two diagonally opposed edges in FIG. 33, which are formed between the flat faces 204 and the bevelled faces 204' of the paddle member. The sleeve member 201 further comprises at each end a circular flange 216, 217, the radius of each circular flange being equal to the radius to the outer surface of the short side 212 of the sleeve member. A groove 216' is formed in the periphery of the flange 216 which is intended for securing a sealing bellows (not shown) but is described hereinafter in detail apropos of FIG. 40.

Further, bores 218 are formed in the flange 217 for fastening the sleeve member on a corresponding flange carried by the end of the other transmission shaft in a similar manner to that shown in FIG. 15.

Figure 34:
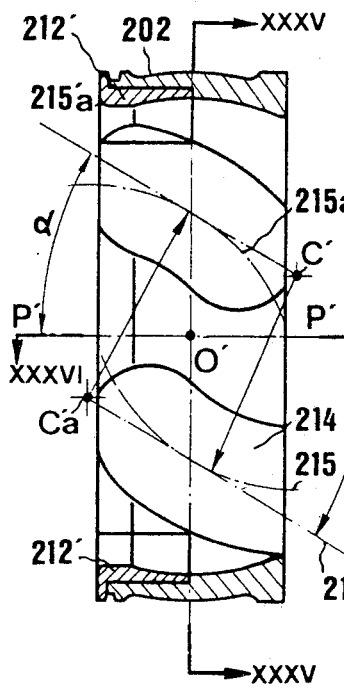
FIG. 34 is a longitudinal sectional view taken on the line XXXIV—XXXIV in FIG. 35 of the sleeve member of the same joint.
Figure 35:
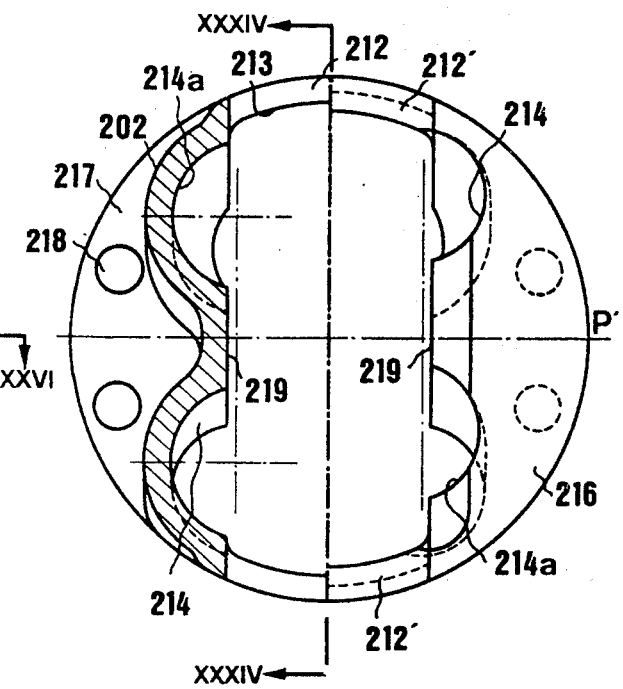
FIG. 35 is a partial end view and a partial sectional view taken on line XXXV—XXXV in FIG. 34.
Figure 36:
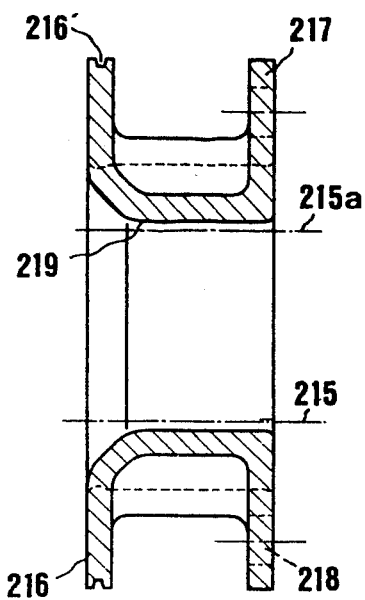
FIG. 36 is a sectional view taken on the line XXXVI—XXXVI in FIG. 34.

As shown at the left in FIG. 34 and at the right in FIG. 35, the interior surface of each short side 212 of the sleeve member which extends between two outer faces of the flange 212 and the transverse plane passing through the point O' is formed by an insert 212' provided with a forward tongue 212'', the insert 212' is received in a corresponding recess formed in the corresponding short side 212. The inserts 212' are held in place by any known means, for example screws (not shown).

Figure 39:
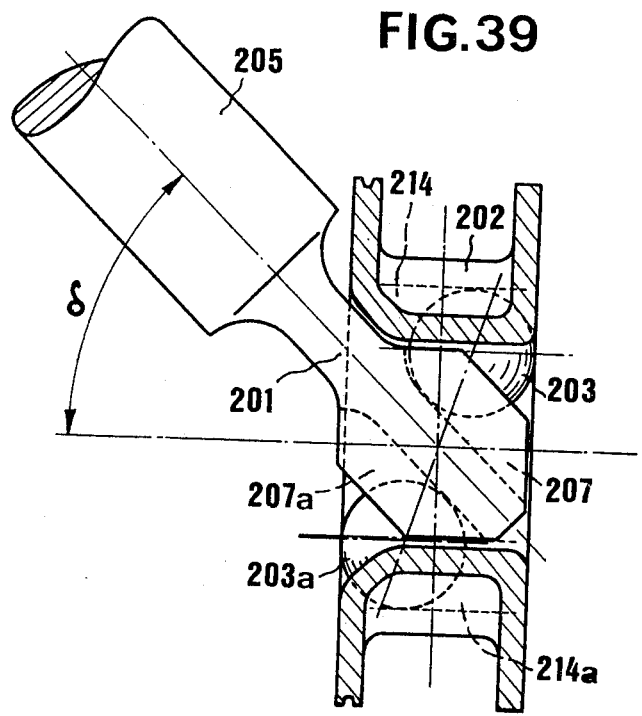
FIG. 39 is a view of the entire joint running at an angle, in a plane perpendicular to that of FIG. 38.

As shown in FIGS. 37–39, similar to that of FIG. 16, the paddle member 201 is received in the sleeve member 202 in the manner of forming a ball-and-socket joint by cooperation between spherical surfaces 206 and interior surfaces 213 of the short sides of the sleeve member, the balls 203 being received in the grooves 207 of the paddle member and the grooves 214 of the sleeve member respectively. The balls 203a are received in the grooves 207a of the paddle member and the grooves 214a of the sleeve member, the two grooves 207 and 214 or 207a and 214a receiving a single ball 203 or 203a which itself ensures the transmission of driving torque either in the direction of rotation of the shaft 205 (clockwise in FIG. 38) which brings into play the balls 203, or in the opposite direction which brings the balls 203a into play. The insertion of the paddle member 201 into the sleeve member 202 is made possible by disassembling the inserts 212' from the short sides of the sleeve member; the balls 203, 203a are held, for example manually, in the grooves 214, 214a at the desired location so that when the paddle member 201 is introduced into the sleeve member from the side the inserts 212' are withdrawn, the balls may easily pass into the grooves 207, 207a through the ends thereof which open onto the corresponding bevelled face 204' of the paddle member 201. Once the paddle member is in place, the inserts 212' are returned and fixed again in place, and the paddle member is thus held in the sleeve member with the center 0 of the paddle member and the sleeve member 0' in coincidence without the possibility of relative displacement of their centers. As in the embodiments of FIGS. 1–9 for example, when the shaft 205 and shaft to which the sleeve member 202 is fixed make an angle δ with each other (FIG. 38), the balls 203 and 203a are displaced in their respective grooves without torque transmission being modified, the centers of the balls which physically form the points of intersection c and d of the center lines 208 and 215 of the grooves 207 and 214 and the grooves 207a and 214a, respectively, are always situated in the bisector plane bisecting the angles formed by the axes, the demonstration of this fact being exactly the same as that given with respect to FIGS. 10—13. As shown in FIGS. 38 and 39, the arrangement chosen provides joints which may run at a very large angle between the shafts it joins.

The operating conditions of the above-described joint are exactly the same as those designed in conformity with FIGS. 16–18, in the sense that the two parts of the joint are held against longitudinal movement with respect to each other and that the straight line joining the plane perpendicular to the plane of FIG. 38, in which are located the centers of the balls 203 cooperating for torque transmission in a given direction of rotation, make an angle δ/2 with the plane passing through the coincident points O,O' and perpendicular to the plane of FIG. 38, the angle δ/2 therefore is equal to half of the above-mentioned angle δ.

Figure 40:
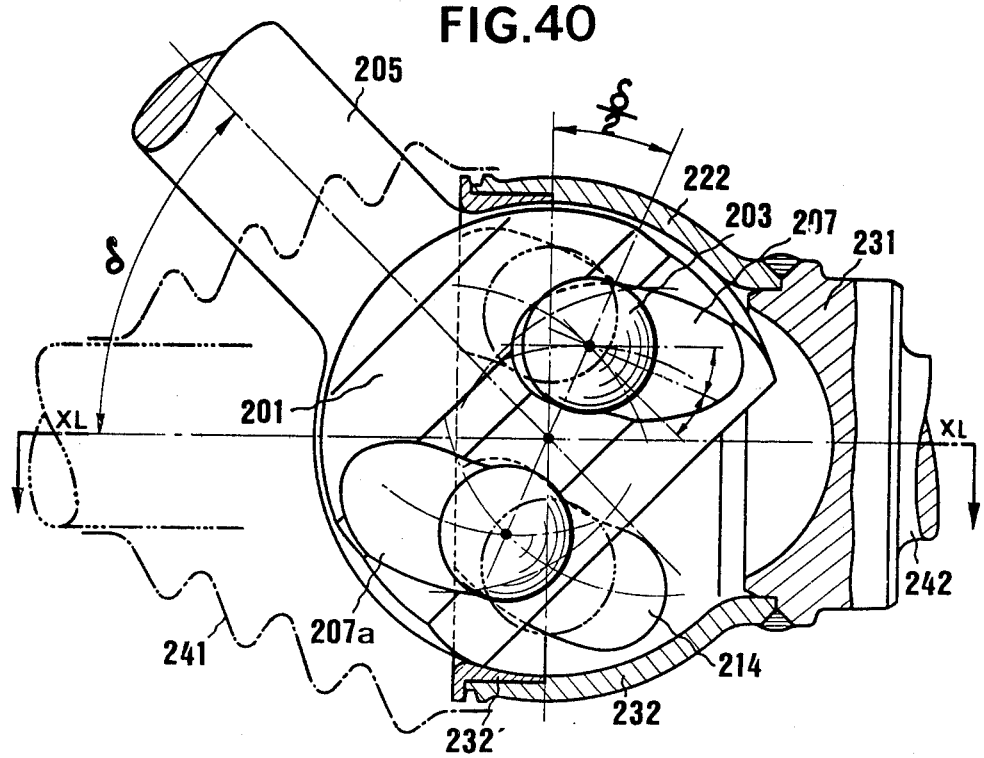
FIG. 40 is a view similar to that of FIG. 37 of another embodiment of the present joint.
Figure 41:
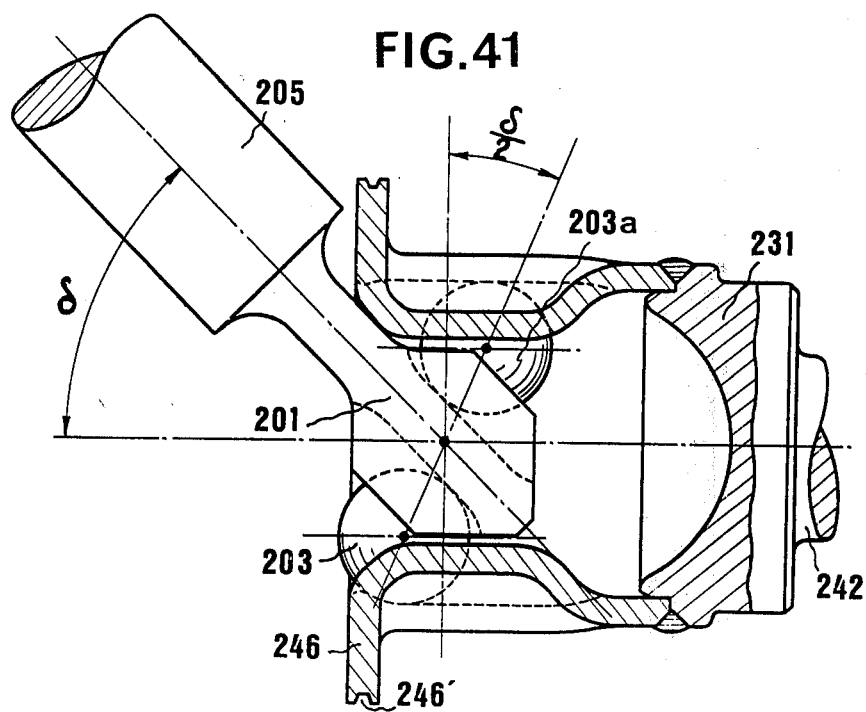
FIG. 41 is a view taken in a plane perpendicular to that of FIG. 40.

The joint shown in FIGS. 40 and 41 only differ from the joint of FIGS. 31–40 in the make-up of the sleeve member. Indeed, the same paddle member 201 is provided as in the preceding Figures and is fixed to a shaft member 205 and provided with grooves 207, 207a which receive balls 203, 203a. As for the sleeve member 222, it is of flattened bell shape of which the short sides 232 have an interior surface 233 of spherical shape and include inserts 232' similar to the inserts 212' of the embodiment of FIGS. 31–39. The closed end of the sleeve member 222 has a circular opening 230 which enables it to be fitted in an end piece 231 on a transmission shaft 242 which is coupled to the shaft 205 by the joint, the sleeve member 222 being welded to the end piece 231.

The sealing bellows 241 is shown schematically in dash-dotted lines in the position corresponding to that of the shafts 205 and 242 being in alignment and is fastened to the sleeve member 222 by means of a ring or clip (not shown) which is received in a groove 246' provided in the edge of the outer flange 246 of the sleeve member 222 clamping the bellows in the groove 246' and by similar means (also not shown) on the shaft 205.

Figure 42:
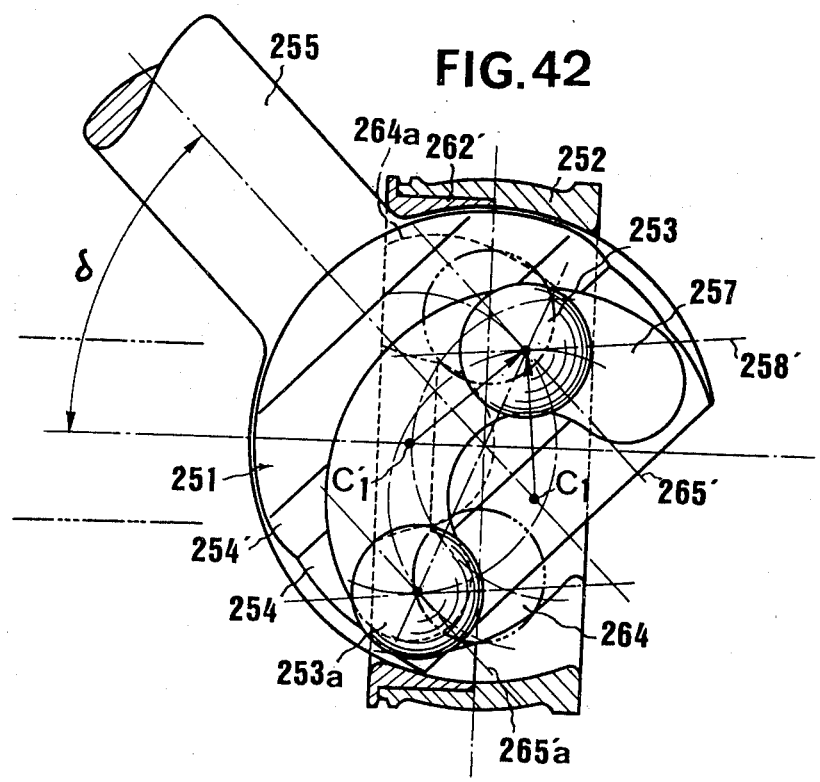
FIG. 42 is a view similar to that of FIG. 40 for a variant of the present joint.

The embodiment of FIG. 42 differs from the two preceding embodiments by the fact that the paddle member 251 fixed to the shaft 255 has along one of its faces 254, 254' a single quarter-torus groove 257 of which the center line is centered at $C_1$ which corresponds to the similar embodiment of FIG. 14 in as much as the lines 258, 258'a tangent to the center line 258 of the groove 257 at points located on a straight line passing through the center 0 of the outer spherical surfaces 206 of the narrow faces of the paddle member make here the same angle with the median plane P of the paddle member, but the angle the tangent line 258 makes with the plane P is of opposite sign to angle the tangent line 258'a makes with the same plane.

The orientation of the grooves 264 and 264a formed in the interior surface of the sleeve member 252 is defined in the same manner, in that the two grooves are centered at the same point $C'_1$ located on the longitudinal axis of the sleeve member 252 which is in the median plane P' of the sleeve member.

Figure 43:
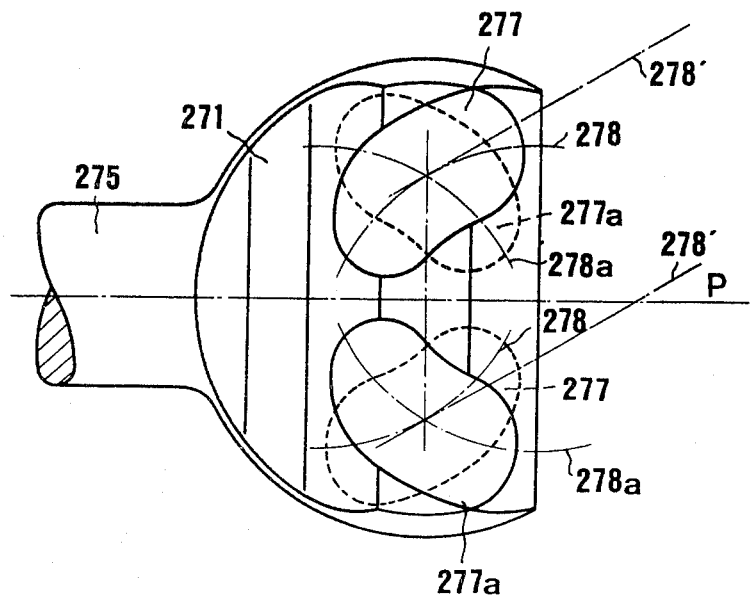
FIG. 43 is a view similar to that of FIG. 31 of still another embodiment of the paddle member of the present joint.

In the embodiment of FIG. 43 only the paddle member 271 integral with a shaft 275 is shown; the lines 278' tangent to the center lines 278 of the grooves 277 disposed diagonally with respect to each other on the opposed faces of the paddle member are parallel to each other, but the grooves 277 and 277a formed in the same face of the paddle member are oriented in the opposite direction, the angle that the tangents 278'a make with the median plane P being equal to and opposite in sign to the angle the tangent 278' makes with the center line 278 of the groove 277 in the same face with the same plane P, assuming that the tangents 278' and 278'a are defined in the same manner as the tangents 208', 208'a in FIGS. 31–39 or tangents 258, 258'a in FIG. 42.

As shown in FIGS. 31–43 described above, the make-up of the joint, namely by the presence of relatively thin connecting portion between the body of the paddle member and the shaft to which it is fixed (for example 201″ in FIGS. 31–43 or 281′ in FIG. 44), allows joint to run at a very large angle between the shafts which it couples.

Figure 44:
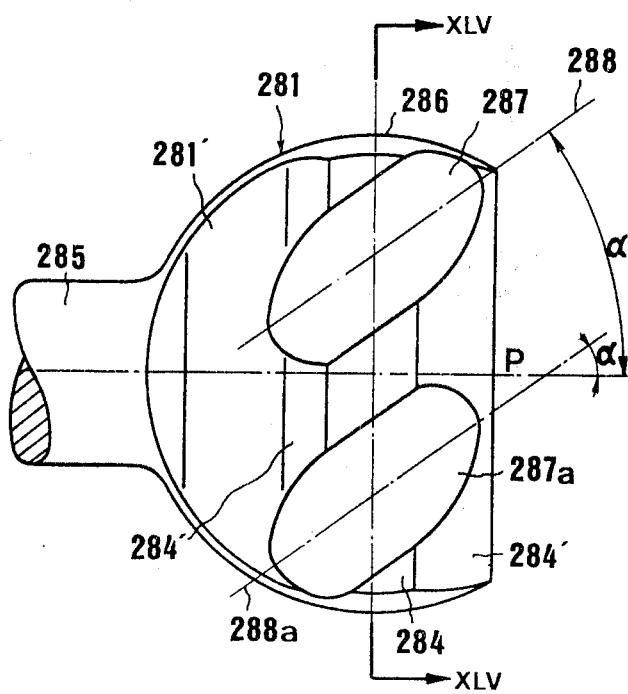
FIG. 44 is a side elevational view of a paddle member of the same overall shape as the paddle members of the embodiments of FIGS. 31–43 but in which the grooves are linear as in the embodiment of FIGS. 1–30.
Figure 45:
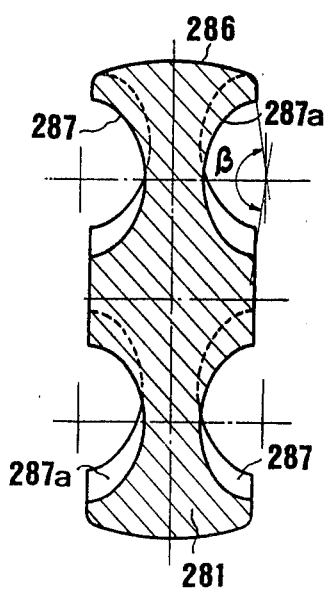
FIG. 45 is a sectional view taken on the line XLV—XLV of FIG. 44.

The embodiment which is shown in FIGS. 44 and 45 concerns a paddle member of overall configuration similar to that of FIGS. 31–33 and 40–43, i.e. it includes a body 281 integral with a shaft 285 and comprises a relatively wide portion delimited by planar faces 284 by bevelled faces 284′ on both sides. The bevelled faces 284′ which are on the side of the shaft 285 are connected thereto by a narrowed portion 281′, the cross-section of the paddle member along its median plane P being substantially identical to that in the embodiment of FIG. 33.

Further, the paddle member, as in the previous embodiments, has spherical surfaces 286 along its short sides, the paddle member being adapted to cooperate with a sleeve member of the same type of one of those of FIGS. 34–36, 40 and 41, for example. The grooves 287, 287a in the paddle member illustrated in FIGS. 44 and 45 have linear axes 288, 288a as the grooves of the joints of FIGS. 1–9, inter alia, the angle $\alpha$ that the axes 288, 288a make with the median plane P of the paddle member being the same. The angle of coverage or enclosure $\beta$ (FIG. 45) afforded by the grooves 287, 287a for the balls (not shown) may be very large, approaching 180° in the central part of the paddle member situated immediately to either side of the plane of the line XLV–XLV in FIG. 44.

Figure 46:
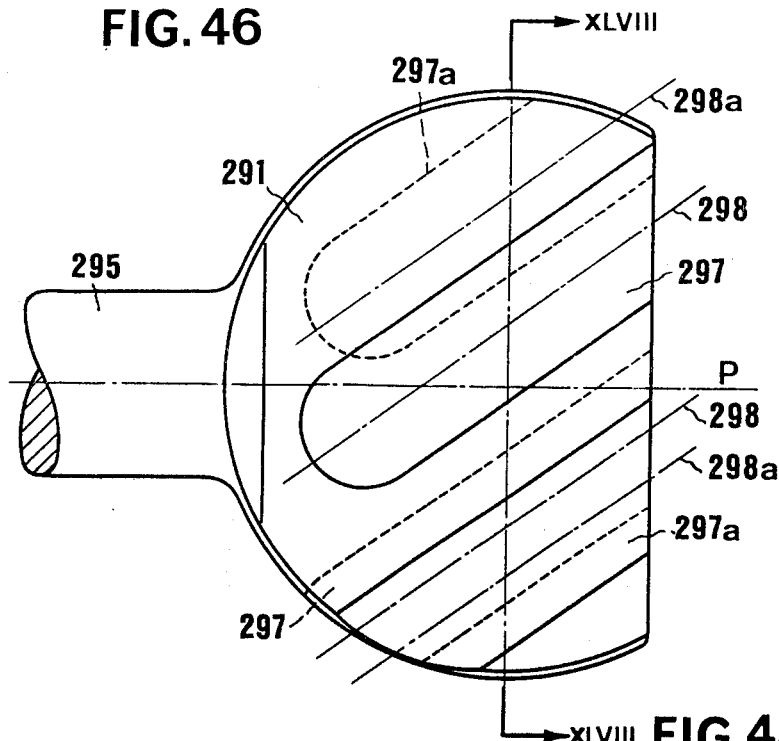
FIG. 46 is a side elevational view of a paddle member also having linear grooves as in the embodiments of FIGS. 1–30, the entire joint being arranged to enable the reduction of the interaxis spacing of the balls to a minimum.
Figure 47:
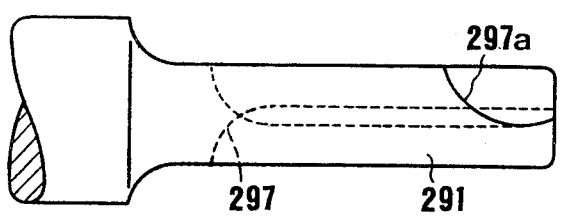
FIG. 47 is a top view of the paddle member of FIG. 45.
Figure 48:
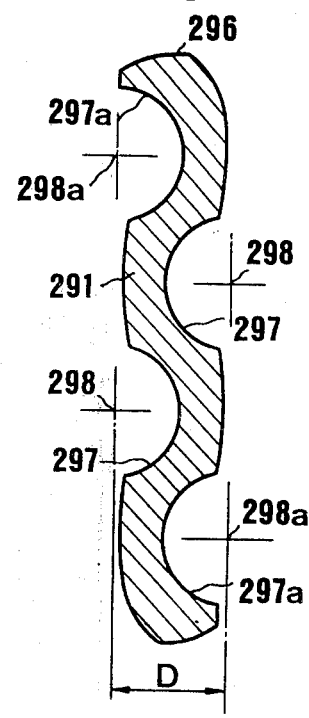
FIG. 48 is a cross-sectional view taken on the line XLVIII—XLVIII in FIG. 46.

FIGS. 46–48 illustrate a paddle member with linear grooves adapted to cooperate with a corresponding sleeve member as previously shown, in particular in FIGS. 1–9. In side view (FIG. 46), the paddle member is in the form of a part-circular plate 291 integral with a shaft 295. The paddle member 291 comprises along its lateral edges or sides narrow spherical surfaces 296.

As shown more particularly in FIGS. 46 and 48, the grooves 297, 297a provided along one of the faces of the paddle member have axes 298, 298a parallel to each other and are vertically offset (as visible in FIGS. 46 and 48) with respect to grooves 297, 297a, located in the other face of the paddle member, the axes 298, 298a of the grooves 297, 297a are also parallel to the axes of the grooves on the other face of the paddle member. It is thus possible to reduce the distance D between the axes of the grooves on both sides of the paddle member (FIG. 48), and it is noted that the forming of the body of the paddle member 291 with a view to defining the grooves 297, 297a may be with advantage effected by simple bending and dicing of a flat plate which obvious greatly diminishes production costs.

The preceding embodiments are, of course not in any way limiting and numerous constructional and mechanical variations may be made in the embodiments without going beyond the scope of the invention as defined in the appended claims. In particular, in all the embodiments the guiding paths for the balls or rollers are inclined at 45° with respect to the axes of their corresponding shafts. As mentioned in the preamble of the present specification, this angle may differ from this value and ranged between about 10° and 45°. Below 10° the possible angle between the two shafts coupled by the joint becomes too small and the risk of jamming may be encountered. Above 45°, deleterious friction may develop and the machining and assembly is complicated.

What is claimed is:

1. A constant velocity ratio universal joint for transmission of rotational motion between two shafts adapted to run at a variable angle between one another, comprising two main parts each mounted for rotation with one of the shafts to be coupled, at least two pairs of balls for torque transmission between the main parts, each of said balls being guided along two associated arcuate cross-sections rolling surfaces each of which is provided on one of said main parts, said rolling surfaces being parts of surfaces of revolution, the cross-sections centerlines of which defining two associated guiding paths each of which being oriented to cut its associated guiding path at an angle of $2\alpha$ and to make an angle $\alpha$ with the longitudinal axis of the shafts at the point of intersection between said associated guiding paths when said shafts are in alignment, each main part having one longitudinal plane of symmetry on both sides of which each guiding path for a given pair of balls is symmetrically located with a guiding path for the other pair of balls and vice versa, lines tangent to the guiding paths on one main part at the points of intersection of said guiding paths with their associated guiding paths on the other main part being parallel for a given pair of torque transmitting balls, characterized in that the axis of revolution of the rolling surfaces on each main part for a given pair of balls cut the longitudinal plane of symmetry of that main part, the points of intersection of said axis of revolution with said plane being located on a straight line passing through the longitudinal axis of said main part and equidistant with the point of intersection of said straight line with said longitudinal axis.

2. A joint according to claim 1, wherein one of the main parts is a generally triangular paddle-shaped member and the other main part is a sleeve member of rectangular interior cross-section, said grooves being formed in the large faces of the main parts, each small face of the paddle member having a projection with a spherical surface centered on the longitudinal axis of the shaft on which the paddle member is mounted, said projection bearing against the interior face of the corresponding short side of the sleeve member.

3. A joint according to claim 2, wherein the interior faces of the short sides of the sleeve member have spherical surfaces centered on the longitudinal axis of the shaft on which the sleeve member is mounted, the last-mentioned spherical surfaces corresponding to the spherical surfaces of the paddle member.

4. A joint according to claim 2, wherein the sleeve member includes a sleeve, the grooves being formed along the interior surface of the sleeve, the grooves being open at their ends remote from the end of the sleeve through which the paddle member is inserted, the end of the sleeve relatively adjacent to the open ends of the grooves having a flange for fastening the sleeve member to its associated shaft.

5. A joint according to claim 4, wherein the last mentioned end of the sleeve is closed off with a plate sealingly fastened thereto, and further comprising a sealing bellow expending between the sleeve and shaft associated with the paddle member.

6. A joint according to claim 2, wherein the sleeve member is lined with a sleeve of elastomeric materials, small plates having ball-receiving grooves being applied against the interior wall of the elastomeric sleeve along the long sides of the sleeve member, the spherical surfaces formed on the projection on the small faces of the paddle member resiliently bearing against the corresponding short sides of the elastomeric sleeve.

7. A joint according to claim 1, wherein there are $2n$ pairs of balls distributed two-by-two diagonally on arms in extension of one another on the paddle member, the paddle member being in the form of a star with $2n$ arms, n being a whole number between 2 and 4 inclusive.

8. A joint according to claim 1 characterized in that the rolling surfaces are part-cylindrical grooves.

9. A joint according to claim 8, each main part of which having two major faces, the major faces of a main part being in sliding engagement with the major faces of the other main part for torque transmission by means of pairs of balls guided along grooves provided on said faces, characterized in that each major face comprises two walls forming a solid dihedral angle, the walls acting with a given pair of torque transmitting balls being parallel to each other on each main part, and said walls being parallel with the associated coacting walls of the other main part when the shafts are in alignment, said dihedral angles formed by the walls of each major face determining the radial position of each main part with respect to the other one.

10. A joint according to claim 9 characterized in that the edges of the solid dihedral angles on each main part project outwardly from the longitudinal axis of each main part.

11. A joint according to claim 10 characterized in that one main part is a paddle member the edges of the dihedral angles of which project with respect to the body of said member and the other main part is a sleeve member the edges of the dihedral angles of which are recessed with respect to the body of said sleeve member.

12. A joint according to claim 9 characterized in that the edges of the solid dihedral angles of each main part are projecting inwardly towards the longitudinal axis of each main part.

13. A joint according to claim 12 characterized in that one main part is a paddle member the edges of the dihedral angles of which are recessed with respect to the body thereof and the other main part is a sleeve member the edges of the dihedral angles of which project with respect to the body of said sleeve member.

14. A joint according to claim 13 characterized in that the dihedral angles of each main part are at 90°.

15. A joint according to claim 12 characterized in that at least one of the main parts is fork-shaped, the axis of revolution of each part-cylindrical groove along which a ball is guided cutting the longitudinal plane of symmetry of said main part at a point located on the longitudinal axis of said main part.

16. A joint according to claim 15 characterized in that both main parts are fork-shaped and identical to each other, the branches of one main part being engaged between the branches of the other one.

17. A joint according to claim 1 characterized in that the rolling surfaces are part-toroidal grooves.

18. A joint according to claim 17, wherein one of the main parts is a generally triangular paddle-shaped member and the other main part is a sleeve member of rectangular interior cross-section, said grooves being formed in the large faces of the main parts, each small face of the paddle member having a projection with a spherical surface centered on the longitudinal axis of the shaft on which the paddle member is mounted, said projection bearing against the interior face of the corresponding short side of the sleeve member.

19. A joint according to claim 18, wherein the faces of the paddle member and the faces of the sleeve member, which are perpendicular to faces in which the guiding grooves are formed and which extend towards means joining the shafts to be coupled by the joint, are provided with spherical mating surfaces centered respectively on the axes of shafts, the sleeve member being divided in two parts said two parts being separable along a plane passing through the centers of spherical mating surfaces, and means being provided for joining said two parts together.

20. A joint according to claim 17, wherein one of the main parts is a generally part-circular paddle-shaped member and the other main part is a sleeve member of generally rectangular interior cross-section, the grooves being formed in the large faces of the main parts, each part-circular side of the paddle member having a projection with a spherical surface centered on the longitudinal axis of the shaft on which the paddle member is mounted, said projection bearing against the interior face of the corresponding short side of the sleeve member.

21. A joint according to claim 20, wherein the interior faces of the short sides of the sleeve member have spherical surfaces centered on the longitudinal axis of the shaft on which the sleeve member is mounted, the last mentioned spherical surfaces corresponding to the spherical surface of the paddle member.

22. A joint according to claim 20, wherein the faces of the paddle member and the faces of the sleeve member which are perpendicular to faces in which the guiding grooves are formed, and which extend towards means joining the shafts to be coupled by the joint are provided with mating spherical surfaces, centered respectively on the axis of the shafts, the sleeve member being divided in two parts separable along a plane passing through the center of the mating spherical faces, means being provided for joining the two parts.

* * * * *